United States Patent
Ramer et al.

[11] Patent Number: 6,088,091
[45] Date of Patent: Jul. 11, 2000

[54] POSITION TRACKING SYSTEM

[75] Inventors: David P. Ramer, Dayton, Ohio; Jack C. Rains, Jr., Herndon, Va.

[73] Assignee: Advanced Optical Technologies, LLC, Chevy Chase, Md.

[21] Appl. No.: 09/075,878

[22] Filed: May 12, 1998

Related U.S. Application Data

[62] Division of application No. 08/781,826, Jan. 10, 1997, abandoned.

[51] Int. Cl.$^7$ .............................. G01B 11/26; G01J 1/00; F21V 1/00
[52] U.S. Cl. ..................... 356/141.5; 362/545; 362/240; 250/228; 250/206.1; 250/203.3; 356/236
[58] Field of Search .................................. 362/544, 545, 362/240, 32, 301, 302, 346; 356/141.2, 141.5, 121, 236; 250/228, 206.1, 203.3

[56] References Cited

U.S. PATENT DOCUMENTS

| | | |
|---|---|---|
| 1,267,967 | 5/1918 | Brunnworth et al. . |
| 1,640,448 | 8/1927 | Halvorson, Jr. . |
| 1,676,463 | 7/1928 | Ryan . |
| 2,296,018 | 1/1942 | Erst et al. . |
| 2,401,940 | 6/1946 | Lange ....................... 362/240 |
| 2,469,412 | 5/1949 | Roebken . |
| 2,969,018 | 1/1961 | Erst et al. . |
| 3,637,309 | 1/1972 | Hosterman . |
| 3,772,506 | 11/1973 | Junginger . |
| 3,777,160 | 12/1973 | Bernt . |
| 4,027,161 | 5/1977 | Williams et al. . |
| 4,144,556 | 3/1979 | Bond . |
| 4,309,746 | 1/1982 | Rushworth . |
| 4,443,706 | 4/1984 | DiMatteo et al. . |
| 4,527,158 | 7/1985 | Rumnels ................... 340/961 |
| 4,667,112 | 5/1987 | Grossman . |
| 4,711,998 | 12/1987 | Malek . |
| 5,051,872 | 9/1991 | Anderson . |
| 5,105,347 | 4/1992 | Ruud et al. . |
| 5,153,426 | 10/1992 | Konrad et al. . |
| 5,165,064 | 11/1992 | Mattaboni ................. 356/152 |
| 5,309,339 | 5/1994 | Webb . |
| 5,393,970 | 2/1995 | Shau et al. . |
| 5,510,893 | 4/1996 | Suzuki . |
| 5,519,534 | 5/1996 | Smith et al. . |
| 5,532,473 | 7/1996 | Chin . |
| 5,556,189 | 9/1996 | Wallis . |
| 5,587,580 | 12/1996 | Venier et al. ................ 250/206.1 |
| 5,705,804 | 1/1998 | Ramer et al. . |
| 5,719,670 | 2/1998 | Duboz et al. ................ 356/141.2 |
| 5,733,028 | 3/1998 | Ramer et al. . |
| 5,773,819 | 6/1998 | Ramer et al. . |

FOREIGN PATENT DOCUMENTS 516361  1/1940  United Kingdom .

*Primary Examiner*—Mark Hellner
*Attorney, Agent, or Firm*—McDermott, Will & Emery

[57] ABSTRACT

An optical position tracking system that tracks the position of objects, using light intensity and/or frequency with the application of geometry and ratios of detector responses, is provided, having light distributing and light detecting components that employ the concepts of constructive occlusion and diffuse reflection. Diffusely reflective cavities, masks and baffles are used to improve certain radiating characteristics of the distributing components and certain response characteristics of the detecting components, to tailor the radiation and detection profiles thereof, including them substantially uniform for all angles within a hemispheric area which the distributing and detecting components face. The distributing and/or detecting components are partitioned with specially-configured baffles. A partitioned distributor has distinct emission sections where the sections can emit spectrally-different or distinguishable radiation. A partitioned detector has distinct detection sections where the sections can detect radiation from different directions. The system may be variously configured, to use different combinations of partitioned and nonpartitioned devices. In most configurations, a single head module provides one set of directional data about two coordinates (e.g., $\rho$ and $\Theta$) for one reflector. An additional head module remotely positioned from the first head module can provide a second set of directional data for the reflector (e.g., $\rho_2$ and $\Theta_2$), for cross-referencing with the first set of directional data to obtain positional data in three dimensions of the object being tracked.

21 Claims, 27 Drawing Sheets

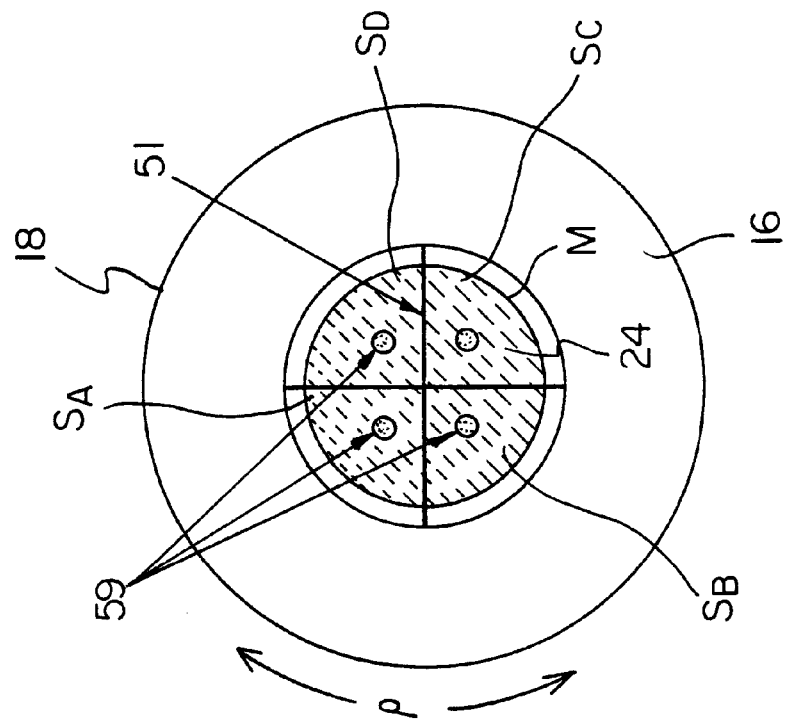
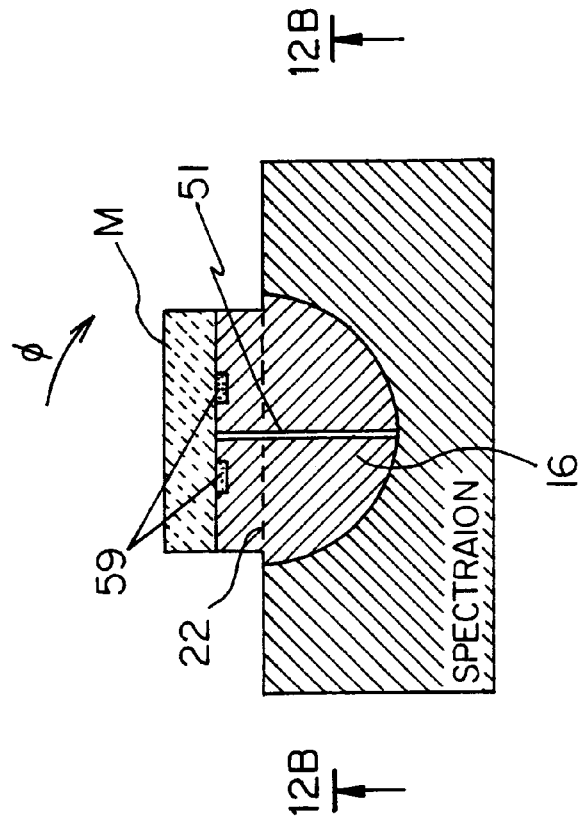
Figure 12A
Figure 12B

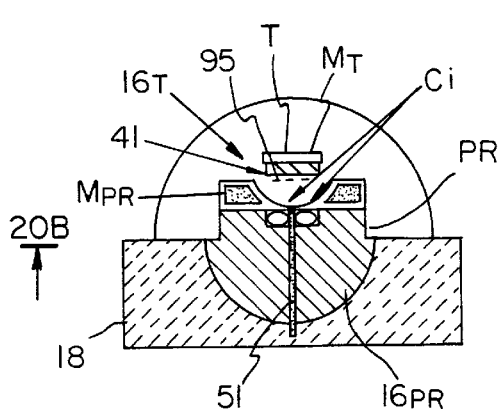 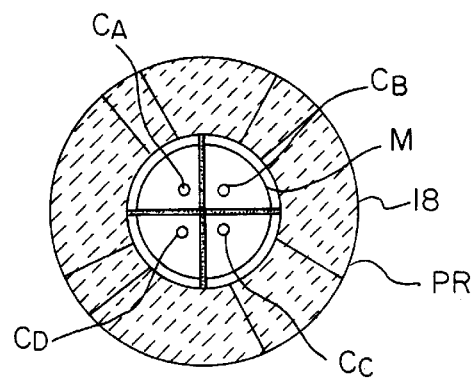
Figure 20A    Figure 20B
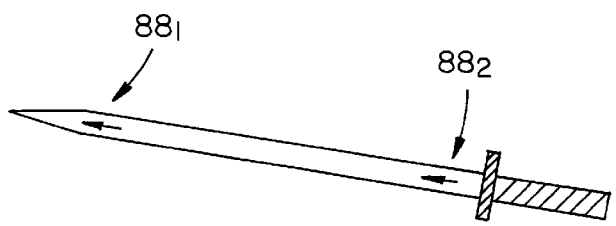
Figure 21
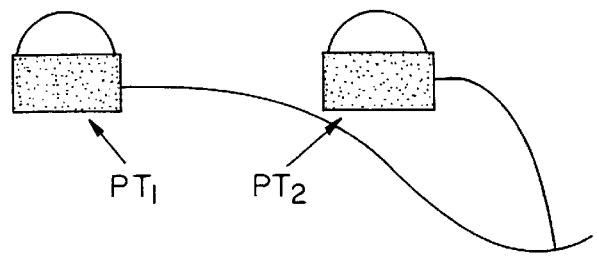

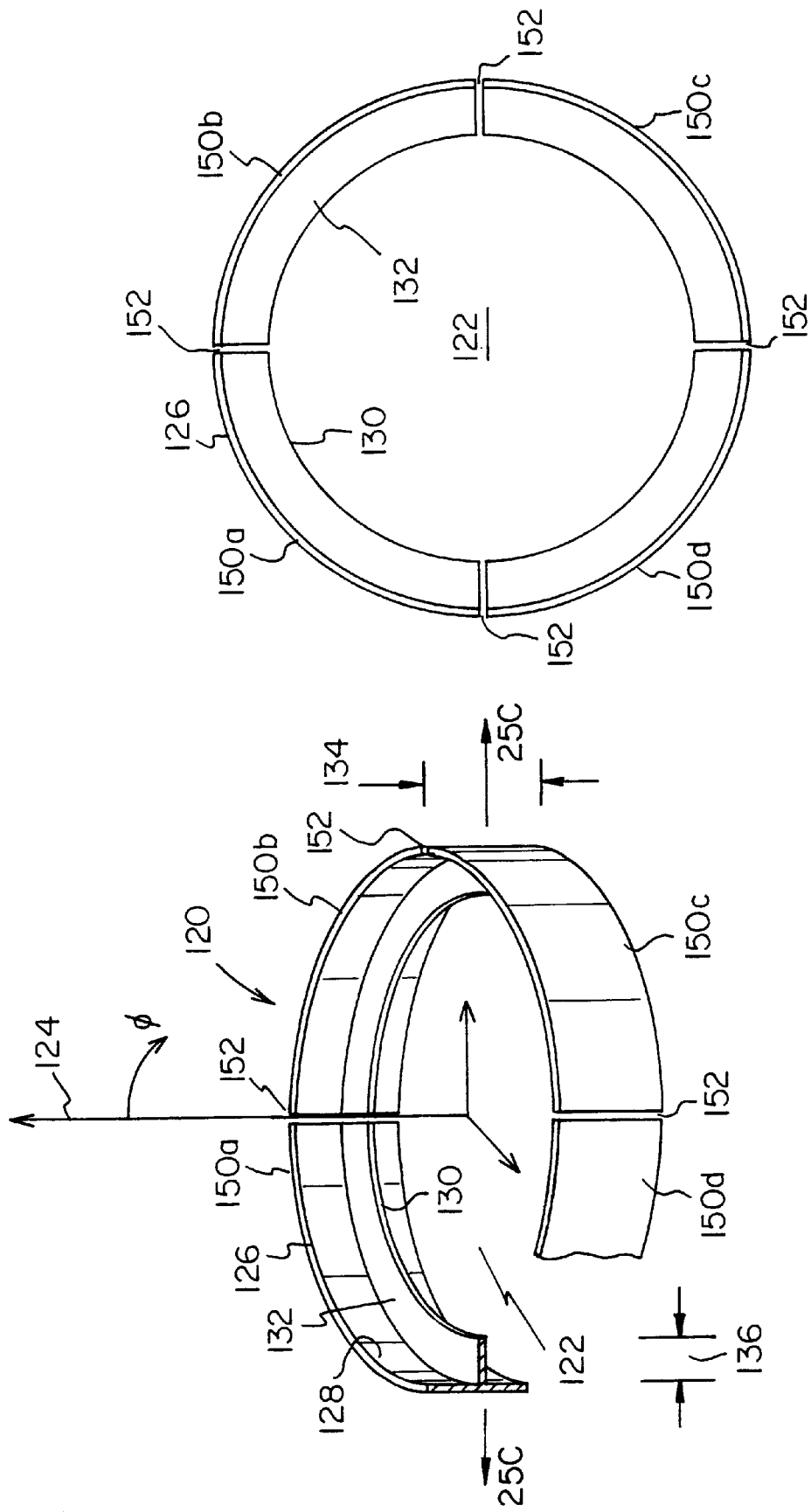

POSITION TRACKING SYSTEM

This application is a division of Ser. No. 08/781,826 filed Jan. 10, 1997 now abandoned.

BACKGROUND OF THE INVENTION

The present invention relates generally to optical emitters and detectors, and optical position tracking devices, in particular, optical devices having distinct radiation and detection properties that may be used to track position of objects, using a relatively small number of optical elements.

Position tracking is a growing technology with ever increasing applications. For example, in the entertainment arena, position tracking in three dimensions is used in virtual reality simulation. Position tracking is also used in the industrial arena, with applications in process control and robotics. The field of biomedics also uses position tracking devices for tracking portions of a human body to determine the body's motion patterns. Similarly in animation dynamics, the tracking of multiple body parts is used for controlling animated figures. Many other applications exist, for which position tracking is useful if not advantageous.

Conventional position tracking can be broken down into two broad technologies, i.e., active systems and passive systems. Active systems utilize active electronic elements on the objects being tracked. For example, the Polhemus' 3SPACE ISOTRACK II® system uses active magnetic elements to create a dynamic magnetic field that is representative of the body's position. By sensing changes in the magnetic field, the system delivers all six axes of the object's spatial location.

Active systems are generally high-performance, high-end products. However, they can have disadvantages, including limited range of motion, metal interference, complex operation and high cost. In particular, the range of the magnetic field is typically limited, and trailing connection wires are often a nuisance. Where the area of motion contains substantial metal, mapping of the entire field is usually part of the system's required initialization.

In contrast, passive systems track objects without physical links between the object and the system. Target points such as retro reflectors may be used, or image processing of a video image may be performed. While passive systems are often less complex and less expensive compared to active systems, they are often lacking in resolution. Thus, for object recognition, passive systems typically require extensive image processing, which can increase costs and the probability of errors. The use of is reflectors avoids some of these problems, but not without introducing other problems, such as the need for critical alignment and extensive initialization.

Aside from the various system limitations discussed above, the sensing components of an optical detector, such as photodiodes or charge-coupled device (CCD), have their own limitations. While these components can be made directionally-sensitive (e.g., with the provision of a slit, or the use of Gray-coded multi-element arrays), the response is often limited. For example, they typically provide directional information or resolution about one axis only, and the sensor's accuracy is typically limited by the number of optical elements provided.

It should therefore be appreciated that there exists a definite need for a relatively simple and inexpensive position tracking system, which can track the position of an object along at least three axes, if not all six axes to include objection rotation, using minimal electrical and/or optical elements. It is desired that the system has low alignment and initialization requirements and low processing demands. In that regard, it is desired that the system be structurally and electronically simple, while remaining capable of providing at least directional indicative of the direction along which the object is positioned relative to the system. It is further desired that the system be able to provide locational data inclusive of range data, along with directional data, for tracking an object in three dimensional space. The present invention addresses all of these desires and more.

SUMMARY OF THE INVENTION

The present invention resides generally in an optical position tracking system that tracks the position of objects, using light intensity and/or frequency with the application of geometry and ratios of detector responses.

The present invention provides for the illumination of an area that may be defined by spherical or hemispherical coordinates with a tailored spatial intensity profile, and/or the detection of light associated with an object in the area, with the recognition that certain characteristics or properties of the light detected are indicative of the relative position or movement of the object in the area. Advantageously, the invention applies the concepts of constructed occlusion and diffuse reflection to accomplish its purpose with improved efficiency.

The positioning tracking system in one embodiment includes a retro reflector that is affixed to the object being tracked, and a head module that includes a light distributor and a light detector. Constructed occlusion as employed by the present invention includes the use of a mask that improves certain radiating characteristics of the distributor and certain response characteristics of the detector. For example, a mask in a predetermined position enables the distributor to provide a more uniform radiation profile, and the detector to provide a more uniform response profile, at least for elevations approaching the horizon. In general, changing the position and/or size of the mask changes the radiating and response profiles. The profiles may be further manipulated or enhanced with the use of a baffle, particular for the profile at angles at or near the horizon. The baffle can be conical or an intersecting structure. Where the electromagnetic radiation utilized by the present invention includes visible light, components including the mask and the baffle are formed of a Lambertian, polymeric material having a reflectance of approximately 99% for visible wavelengths.

In accordance with a feature of the present invention, the distribution profile of a constructively occluded distributor can be specifically tailored or made substantially uniform for over most, if not all, azimuths and elevations of a hemispheric area over the distributor. Correspondingly, the response profile of a constructively occluded detector can be specifically tailored or made substantially uniform for most, if not all, azimuths and elevations of a hemispheric area over the detector. In essence, constructed occlusion can render both the distributor and detector uniformly omnidirectional in the hemispheric area which the occluded device faces.

In order that the system track the position of a reflector (or point), or at least provide directional information for that reflector, the head module of the system includes a partitioned occluded device which may be either the distributor or the detector. In particular, the use of a partitioning baffle in a distributor renders a partitioned distributor having distinct emission sections where the sections can emit spectrally-different or distinguishable radiation. Correspondingly, the use of a partitioning baffle in the detector renders a partitioned detector having distinct detection sections where the sections can detect radiation from different directions.

The system may be variously configured, to use different combinations of partitioned and nonpartitioned devices, that is, a partitioned distributor with a nonpartitioned detector, or a nonpartitioned distributor with a partitioned detector. A partitioned distributor provides a plurality of radiation sections and a partitioned detector provides a plurality of detection sections. In most configurations, a single head module provides one set of directional data about two coordinates (e.g., ρ and Θ) for one reflector, using one of these combinations, wherein one of the devices is partitioned into four sections or quadrants.

An additional head module remotely positioned from the first head module can provide a second set of directional data for the reflector (e.g., $\rho_2$ and $\Theta_2$) By cross-referencing the second set of directional data with the first set of directional data, the system is able to obtain positional data in three dimensions of the reflector, that is, three coordinates, along three axes for the reflector.

The system can also track additional reflectors, using spectrally-different (or at least spectrally distinguishable reflectors) in conjunction with correspondingly spectrally-compatible sensors to distinguish between data collected for each reflector. Where the system uses a head module having a nonpartitioned distributor and a partitioned detector to detect one reflector, the system can use additional head modules, each housing an additional set of sensors corresponding to an additional reflector. However, the system can also use a single head module that is configured to house all of the additional sets of sensors. In particular, the single head module can be configured having one partitioned detector where each section houses a sensor from a set corresponding to a reflector being tracked. Accordingly, a single head module can track multiple reflectors.

As variations on the head module described above, the nonpartitioned distributor and the partitioned detector may use separate cavities or share a single cavity within the head module. Moreover, as further variations, the nonpartitioned distributor of the head module may emit continuous broad band radiation or pulses of broad band radiation. Where the radiation is emitted in pulses, the elapsed time for the pulse radiation to reflect off the reflector can be analyzed by the system as data providing a range coordinate for the tracked reflector. Using both the intensity variation of the radiation, and the elapse time of the pulses, the system can derive all three coordinates for a reflector, without using a separate head module.

Because the system illuminates the detection zone without discriminating between the object being tracked and any other extraneous objects, such as furniture or walls, background or self illumination can be significant and adversely affect the system's performance. Where sensors of different or distinguishable spectral characteristics are used in the system for detecting multiple reflectors, the system provides a separate set of sensors dedicated to sensing background illumination so that the effects of self illumination can be compensated.

The system may also be configured to reduce the level of background illumination. In particular, the system utilizes a head module having a scanning beam source that is situated between a split partitioned detector. The beam is of a predetermined width and sweeps the detection zone in search of reflectors. With the beam illuminating only a portion of zone at any give time, background illumination is substantially reduced and the system is therefore available to perform a color analysis using a relatively small number of filter sensor combinations to distinguish between a very large numbers of spectrally-distinguishable reflectors. Like the previous embodiments, this embodiment uses two head modules to detect all three coordinates of one reflector.

In an alternative embodiment also using color analysis, the system uses a head module that includes a nonpartitioned detector with a partitioned distributor. The partitioned distributor houses in each section a lamp of a distinguishable color (frequency), such that each section is distinctly associated with a distinguishable color. In accordance with the application of color analysis, the detector houses a small combination of filtered sensors. The color mix reflected by a reflector is analyzed by the system to indicate a set of directional data for the reflector relative to the head module.

The system may also be configured as an optically active system, using active light sources, such as LEDs, that are placed on the object being tracked, and a partitioned detector. In this embodiment, light emitted from the LEDs are detected by the partitioned detector, and the color or oscillation frequencies of the LEDs are used to distinguish between different LEDs.

Other optical devices and position tracking systems are contemplated by the present invention. For example, an optical device configured as a ring having two structures which selectively occludes the optical surface of the other for different elevation angles is provided. Again, the principles of constructed occlusion is applied such that the device has a tailored or substantially uniform profile which can render the device hemispherical as a radiator or a detector. To also render the device directional, the structure may be configured such to provide distinct and separate segments.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 12A is a side cross-section view representative of a partitioned distributor and a partitioned detector, in accordance with the present invention;

FIG. 12B is a cross section view of FIG. 12A, taken along line 12B—12B;

FIG. 20A is a side cross-section view of yet another embodiment of the head module, in accordance with the present invention;

FIG. 20B is a cross-section view of FIG. 20A, taken along line 20B—20B;

FIG. 21 is a perspective view of another embodiment of the system, in accordance with the present invention;

FIG. 25A is a perspective view of a sectioned ring detector in accordance with the present invention;

FIG. 25B is a top plan view of the ring detector of FIG. 25A;

DESCRIPTION OF THE PREFERRED EMBODIMENTS

As shown in the exemplary drawings, the present invention resides in an optical position tracking system 10 that tracks the position of an object, without requiring complicated electrical wiring, expensive photodetector arrays, video cameras, or image processing. More specifically, the system measures optical properties such as light intensity and frequency to provide at least directional data along two axes, if not positional data along three axes, for the object being tracked. If desired, the system may also provide positional and rotational data along six axes for the object being tracked.

Figure 1:
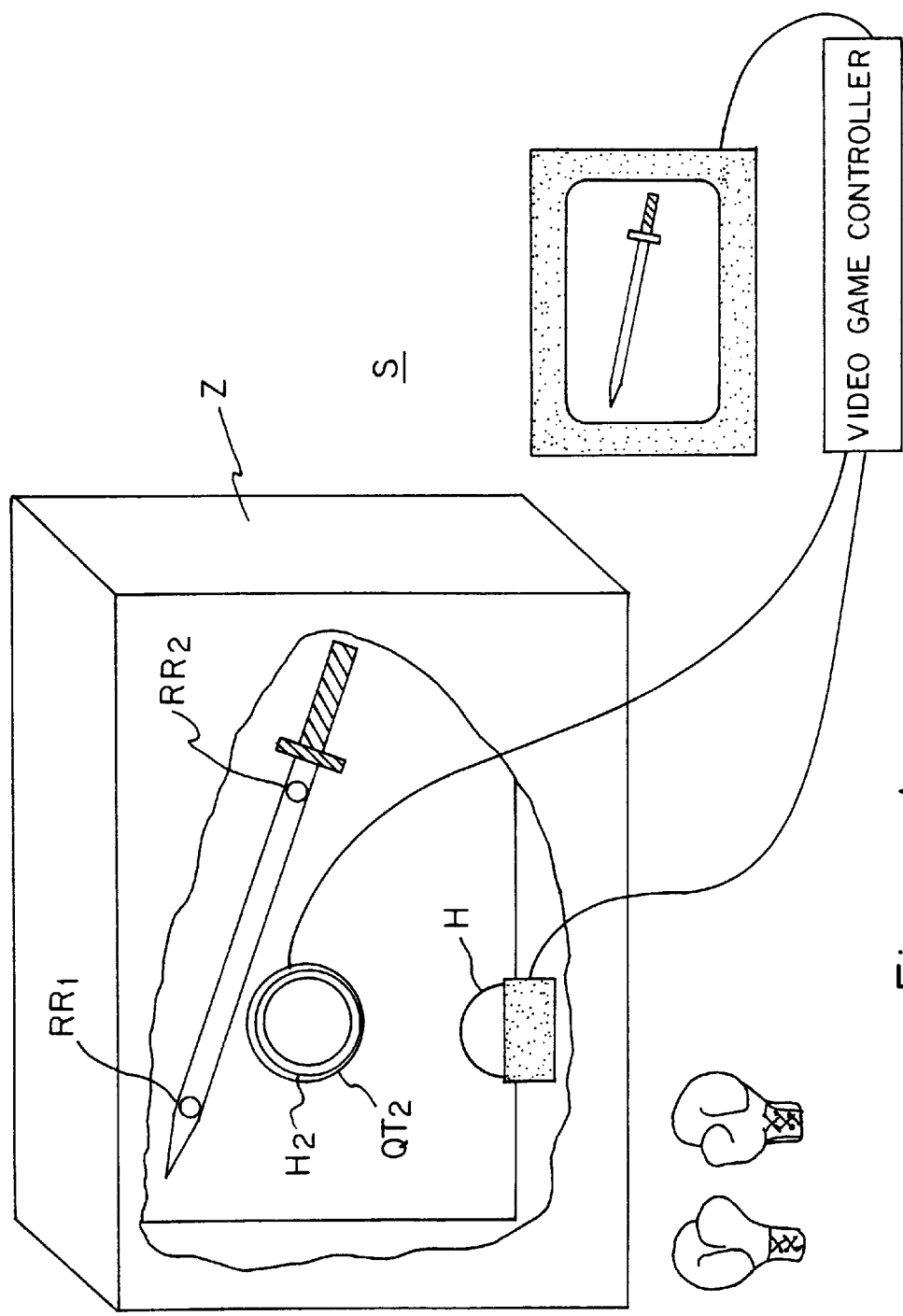
FIG. 1 is a perspective view of a position tracking system, in accordance with the present invention, for determining and displaying the position of game equipment.

Referring to FIG. 1, the position tracking system has numerous applications. For example, the system may be used in a video game 11, where signals representative of the position or movement of game equipment within a zone Z are detected and processed, and converted to video signals fed to a video monitor. Though the system and display 15 are shown outside the zone Z, these components may of course be inside the zone Z.

One embodiment of the position tracking system 10 is shown in FIG. 1, having a head module H tracking a retro reflector RR1. In accordance with a feature of the invention, the head module H utilizes the concepts of constructed occlusion and diffuse reflection, both of which are discussed below in further detail.

Figure 2:
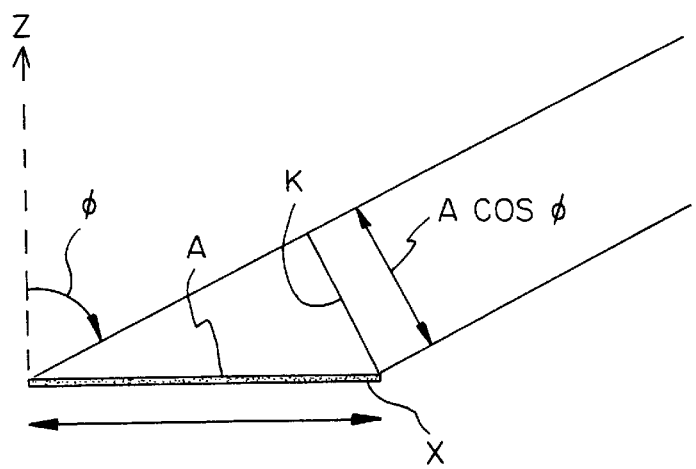
FIG. 2 is a schematic diagram of a Lambertian surface, demonstrating the cosine dependence property associated therewith.

As background, constructed occlusion may be used to change certain characteristics of a substantially Lambertian surface, whether it is an emitter or a detector surface. A substantially Lambertian emitter X is shown in FIG. 2. While the emitter X is illustrated with a planar surface, an emitter surface with substantially Lambertian properties need not be planar.

It is observed that the radiation intensity of the emitter X varies with the angle $\phi$. Thus, the emitter X has a radiation intensity profile that is a function of the angle $\phi$. This function or relationship between the radiation intensity and the angle $\phi$ can be seen in the change in the cross sectional area K of the surface A as the angle $\phi$ changes. In particular, where $\phi$ is defined from the normal of the emitter surface A, the cross sectional area K varies as a cosine function of the angle $\phi$.

FIG. 2 is also representative of a substantially Lambertian detector (also designated by X). While the detector X is shown with a planar surface, a detector surface with substantially Lambertian properties need not be planar. As the emitter X, the detector X has a response intensity profile that is a function of the angle $\phi$. Again, this function can be seen in the change in the cross section area K, which decreases as the angle $\phi$ increases from the normal to the horizon.

Figure 3A:
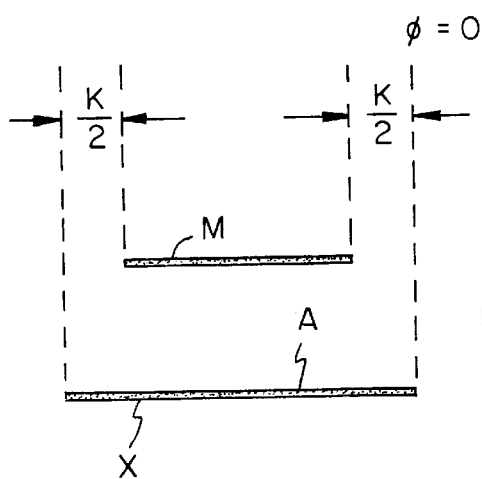
FIGS. 3A and 3B are schematic diagrams of a mask used to constructively occlude a Lambertian surface.
Figure 3B:
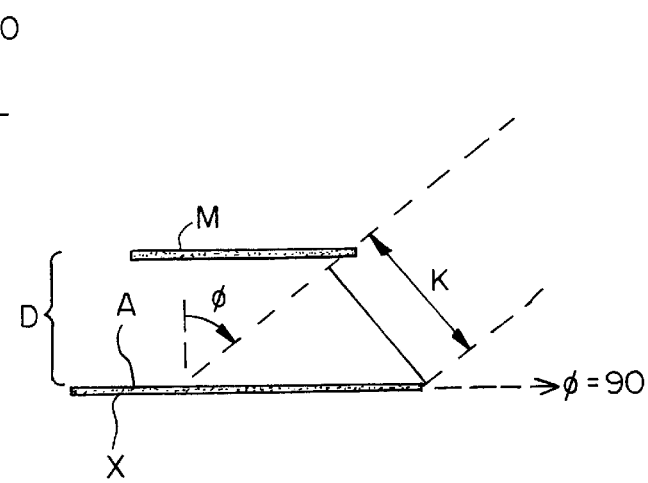

Constructed occlusion aims to reduce, if not eliminate, the cosine dependency on the angle $\phi$ in both the emitter X and the detector X. As shown in FIGS. 3A and 3B, a mask M is employed to constructively occlude the surface A. Properly sized and positioned from the surface A, the mask M is rendered to selectively "block" portions of the surface A, such that the cross section area K remains constant for most angles of $\phi$. Accordingly, the mask M offsets the change in cross section area K such that the radiation or response profile of the surface is substantially uniform for angles of $\phi$, except those near the horizon. For the configuration shown in FIGS. 3A and 3B, the cross section area K remains constant for angles of $\phi$ between 0 and approximately 80 degrees. This range of angles varies with different geometry between the mask, aperture and cavity. Overall, the radiation or response profile may be distinctly manipulated as desired with different mask and surface geometry.

While the mask M may be completely opaque, constructive occlusion may be achieved without complete opacity in the mask M. So long as the mask M provides a relative reduction in the transmission of radiation between occluded and nonoccluded areas, the cosine dependence is altered.

As mentioned, the system also applies the concept of diffuse reflection. As background, a diffusive reflector can increase the efficiency of an optical system by allowing a surface emitter or detector to be replaced by a point emitter or detector. For both cases, reference is made to FIG. 4.

A substantially Lambertian emitting surface LS can be created using a point illuminating element 12 (such as a fiber optic) that illuminates a cavity 16 whose interior surface 20 is diffusely reflective. The cavity 16 diffusely reflects radiation from the point element 12 such that a uniformly illuminated surface 21 is created at the aperture 22 of the cavity 16. Correspondingly, a substantially Lambertian detection surface LS can be created using a point detecting element 12 (such as a photodiode) that detects light within a cavity 16 whose interior surface 20 is diffusely reflective. The cavity 16 diffusely reflects radiation entering the cavity 16 through the aperture 22 such that the point detecting element 12 uniformly detects radiation reaching the aperture 22. It is understood by one of ordinary skill in the art that the point element 12 may be a device localized at the cavity 16, or a light-conveying device, such as a fiber optic 14 or an optical waveguide, that efficiently transmits light into or away from the cavity 16 to another area.

Figure 4:
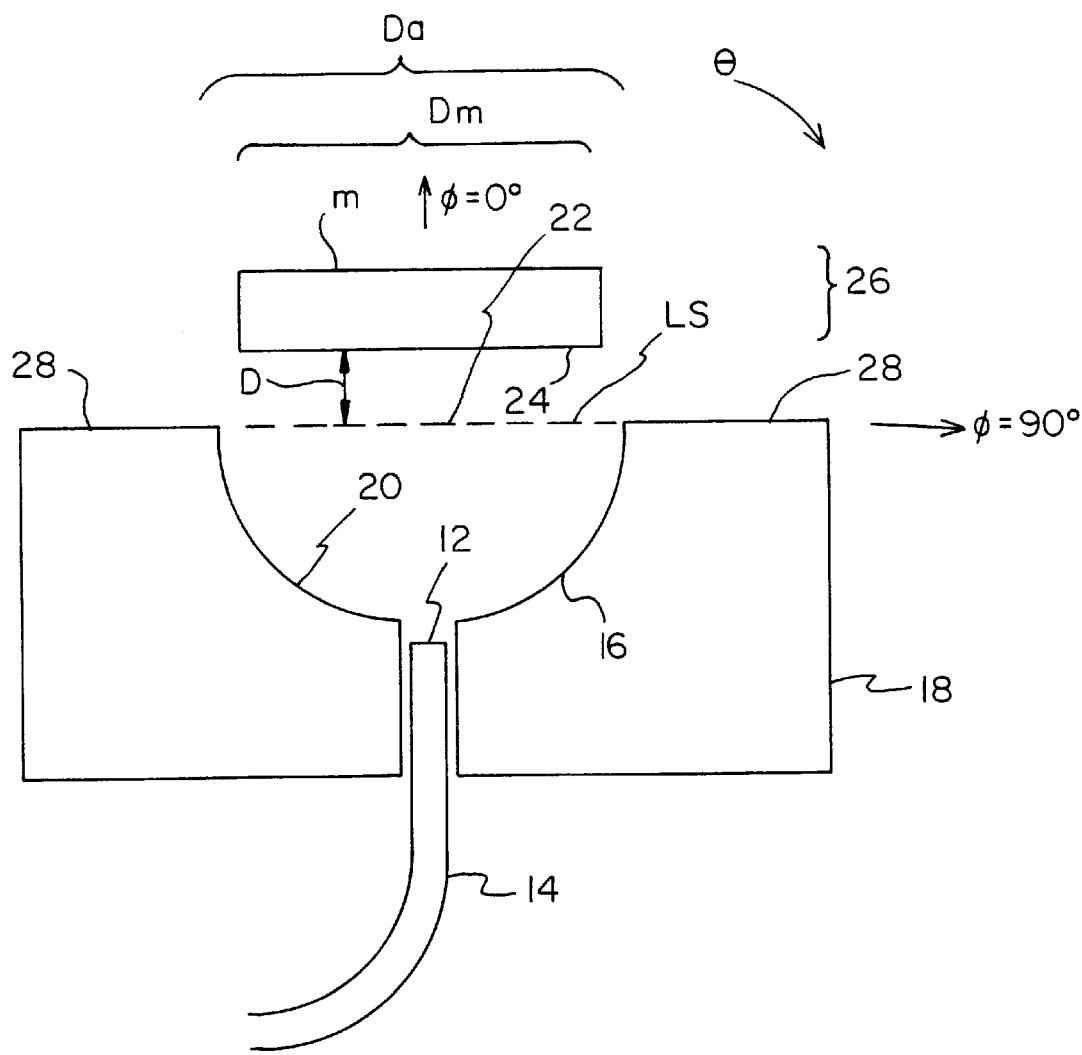
FIG. 4 is a side cross-section view of an optical arrangement employing the concepts of constructive occlusion and diffusive reflection, in accordance with the present invention.

With selective placement and/or sizing of the mask M above the aperture 22, the occluded arrangement of FIG. 4 can either (i) illuminate an area over the aperture 22 with an intensity profile that is substantially uniform in almost all directions of the area, as an occluded distributor, or (ii) uniformly detect radiation over almost all directions of the area, as an occluded distributor, where the area is readily defined in rho and theta directions in spherical or hemispherical coordinates. The radiation and detection profiles can remain substantially uniform for most angles in accordance with the selected mask/cavity/aperture geometry, except for those angles at or near the horizon of the occluded arrangement (hereinafter referred to as the horizon district).

The cavity 16 of FIG. 4 can be provided in a base 18 which also provides a shoulder 28 surrounding the aperture 22 of the cavity. The base 18 may be formed of aluminum, plastic, or like materials, and covered with a coating of diffusely reflective substance, such as barium sulfate, so that the base 18 as a whole can diffusely reflect incident light. The base 18 may also be formed of a diffusely reflective bulk material such as Spectralon® sold by Labsphere Inc., of North Sutton, N.H. Spectralon® is easily machined, durable, and provides a highly efficient Lambertian surface having a reflectivity of over 99%, in visible and near-infrared wavelengths. Other suitable materials, though typically less effective than the diffuse reflective materials mentioned above, include quasi-diffuse reflective materials, such as flat white paint.

The mask M, in particular its underside 24, is also constructed of a diffusely reflective material, such as Spectralon®, so that any light incident on the underside of the mask M is not lost but reflected back into the cavity 16. The light redirected back into the cavity 16 is, on average, reflected many times within the cavity 16 and adjacent diffusely reflective components.

The cavity 16 is illustrated as a hemispherical cavity; however, the cavity may be any shape. Moreover, the size of the aperture 22 need not be comparable to the maximum cross-sectional area of the cavity; that is, the cavity may be more spherical than hemispherical. Furthermore, the aperture 22 need not be planar. However, the hemispherical cavity with a planar aperture may be preferred as it is easier to construct and it affords geometric symmetries that allow the use of simplifying calculations and assumptions.

Where the cavity 16 is hemispherical (or spherical) and the aperture 22 planar, as shown in FIG. 4., the aperture 22 of the cavity 16 defines a diameter $D_a$ and the mask defines a diameter $D_M$. As mentioned, the ratio between the diameters $D_a$ and $D_M$ is a parameter that can change the profile (radiation or response) over the entire 2Π steradian hemisphere which the occluded arrangement faces. In general, uniformity in the profile is increased if the mask/cavity diameter ratio is close to one; however, this ratio reduces the efficiency of the occluded arrangement by diminishing the acceptance/escape area between the mask and the aperture. It is currently believed that by decreasing the intensity for certain angles while increasing the intensity for other angles, the mask substantially averages the profile over a wide range of angles, for a more uniform efficiency for most angles. A mask/cavity diameter ratio of about 0.8 to 0.9 is preferred. This ratio provides a reasonably level profile, while maintaining a relatively high level of efficiency.

The distance or height D between the mask M and the aperture 22 is another parameter that can change the occluded arrangement's radiation or detection profile. Moreover, the thickness of the mask M can also change the profile.

Figure 5:
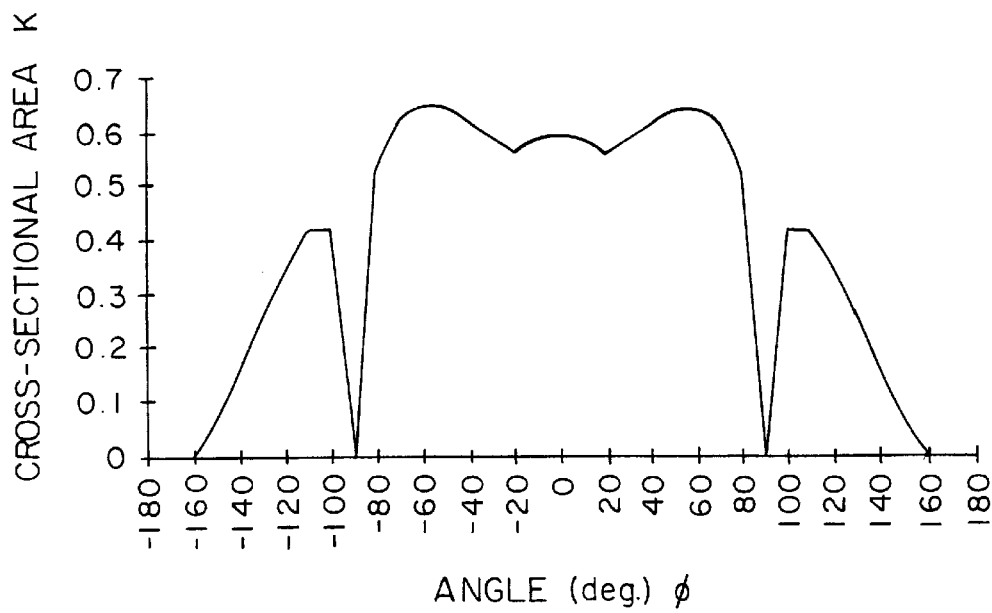
FIG. 5 is a graph illustrating the cosine dependence of the arrangement of FIG. 4.

The graph of FIG. 5 shows the cross-sectional area K of an occluded arrangement with an aperture diameter of approximately 2.0", a mask with a diameter of approximately 1.8", and a separation distance between the mask and aperture of approximately 0.3". It can be seen that the profile of this occluded arrangement remains relatively constant until φ reaches approximately 80 degrees. Thereafter the profile drops dramatically.

As different profiles may be obtained with different mask/cavity/aperture geometry, it may be useful to construct the cavity and mask out of a core material that is pliant, e.g., rubber, so that the cavity and/or mask may be readily reconfigured to provide different geometries with different radiation or detection profiles.

Figure 6:
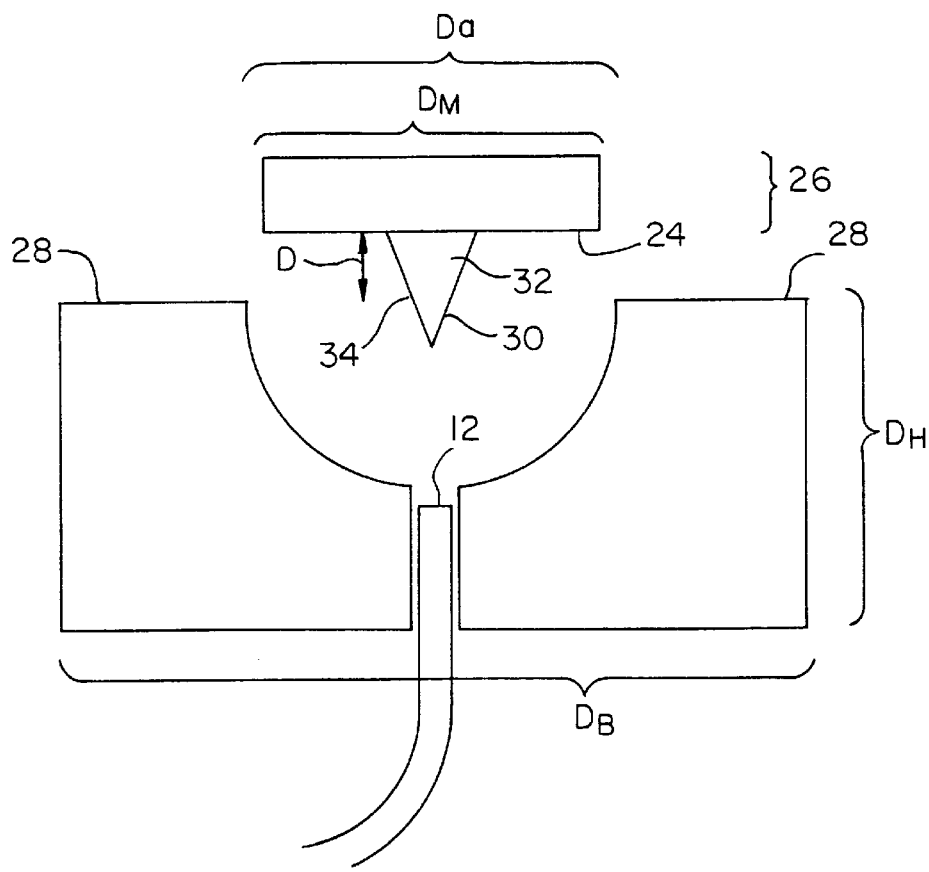
FIG. 6 is a side cross-section view of an optical arrangement employing the concepts of constructive occlusion and diffusive reflection, and a conical baffle, in accordance with the present invention.

In order to expand the uniform portion of the profile into greater angles of φ, that is, into the horizon district, the system 10 may either increase the energy of the illumination radiated or detected, or provide a deflector or baffle 30 as shown in FIG. 6. The baffle 30 is configured to provide a surface 32 below the mask M, that is substantially perpendicular to the horizon district. The surface 32 serves to reflect light to the horizon district to significantly increase the illumination intensity in that district. Like the mask M and the base 18, the baffle 30 is constructed out of a diffusely reflective material such as Spectralon®. The reflectivity of the baffles can be graded so that the baffle can have an angle dependent reflectivity, if desired, for example, to compensate nonuniform effects.

Figure 7:
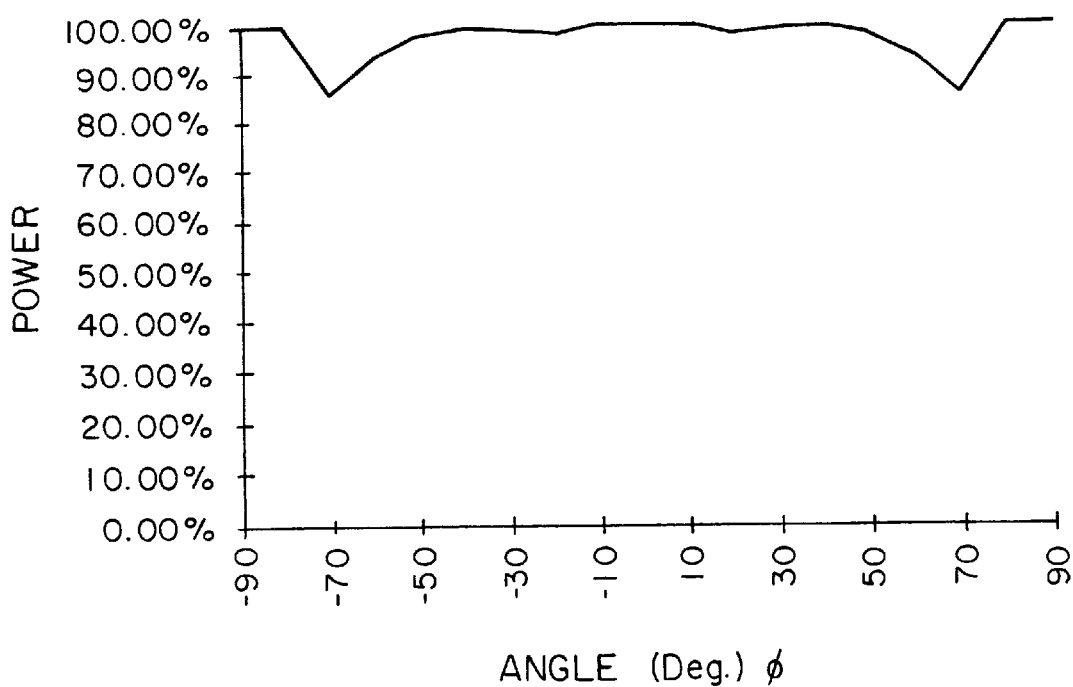
FIG. 7 is a graph illustrating the substantial alleviation or treatment of the cosine dependence of the arrangement of FIG. 6.

Used appropriately, the baffle 30, in conjunction with the shoulder 28, can extend the profile uniformity into angles of φ well beyond 90 degrees (see, e.g., FIG. 7). For an occluded emitter arrangement, the shoulder 28 redirects toward the upper hemispheric area that would otherwise be directed below the horizon. For an occluded detector arrangement, the shoulder 28 blocks light from below the horizon.

As mentioned, the radiation or detection profile over the hemispheric area may be tailored as desired by carefully configuring and dimensioning the cavity aperture 22, the mask M, the baffle 30, and/or the shoulder 28. For example, referring to FIG. 7, an occluded distributor R having an aperture with a diameter $D_a$ of approximately 2.0", that is constructively occluded by a mask M with a diameter $D_M$ of approximately 1.8" and enhanced by a baffle 30 having a base of approximately 0.27" in diameter and approximately 0.21" in length, has a radiation intensity profile that is relatively constant for angles of φ up to 90 degrees.

Figure 8A:
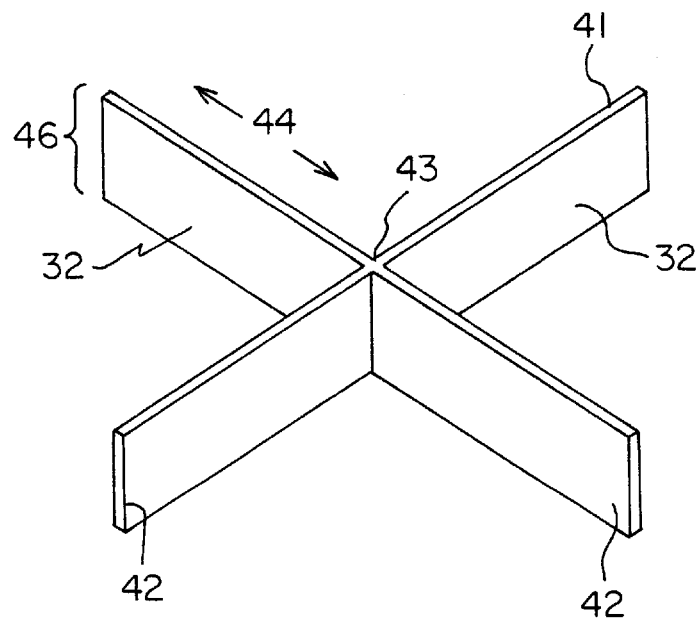
FIGS. 8A and 8B are perspective views of an intersecting baffle, in accordance with the present invention.
Figure 11:
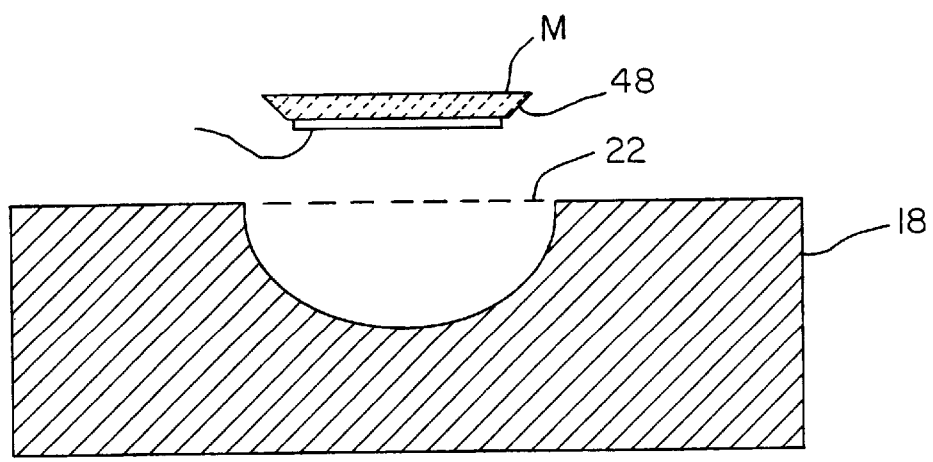
FIG. 11 is a side cross-section view of an optical arrangement with a specially configured mask having properties of a baffle.

Other baffles can be equally effective at increasing the intensity in the horizon district. For example, FIG. 11 shows a baffle that is incorporated into the mask M by bevelling edges 48 of the mask M. Where the mask M has a substantial thickness, the bevelled edges 48 effectively can direct light to the horizon district. Referring to FIG. 8A, an alternative embodiment of the baffle is shown. Also covered with a diffusely-reflective material, a baffle 41 is formed of multiple extended members 42 defining an intersection 43 at their midpoints. The members 42 are preferably planar, but they may be curved or otherwise. The baffle 41 preferably, but not necessarily, defines symmetrical sections S in the occluded arrangement.

The baffle 41 preferably, but not necessarily, has a length 44 substantially equal to the diameter of the aperture 22. Alternatively, the length 44 may be longer to extend beyond than aperture 22, or be shorter and shy of reaching the aperture 22. The baffle 41 preferably, but not necessarily, has a height 46 substantially equal to the separation distance D between the mask M and the aperture 22. Alternatively, the height 46 may be greater or lesser than the separation distance D. Like the baffle 30, the baffle 41 extends toward the aperture 22 of the cavity 16 to create a substantially perpendicular surface 32 relative to the horizon. Consequently, the baffle 41 increases the illumination intensity at the horizon district for a more uniform profile (radiation or response) in the horizon district.

Figure 8B:
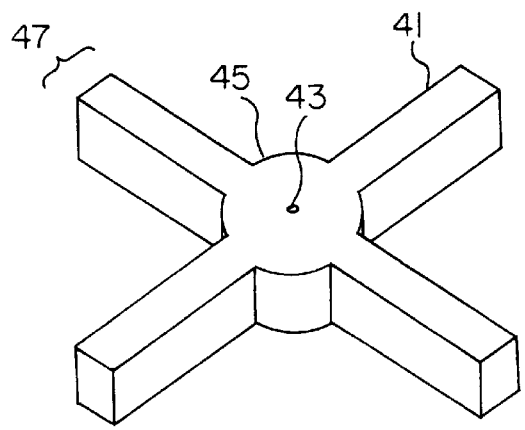

The baffle 41 may be modified as desired to change the profile. A modified baffle 41' is shown in FIG. 8B. The baffle 41' compared to the baffle 41 has an enlarged core 45 at the intersection 43. Although the core 45 is illustrated with a circular cross section, the core 45 may be different shapes. The baffle 41' may also have greater thickness 47 in the members 42.

Figure 10:
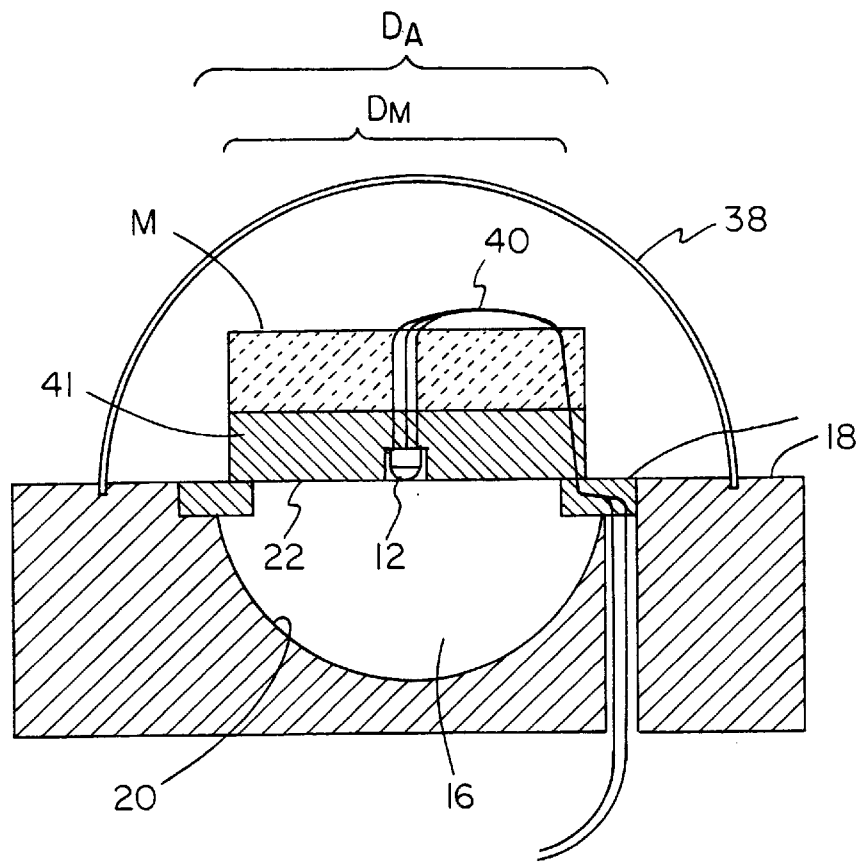
FIG. 10 is a side cross-section view of an optical arrangement employing the concepts of constructive occlusion and diffuse reflection, and the intersecting baffle, with treatment of the Fresnel reflection, in accordance with the present invention.

To obtain a relatively uniform profile, the arrangement of FIG. 10 uses a mask diameter $D_M$ of approximately 1.8" and an aperture diameter $D_a$ of approximately 2.0", which results in a mask/aperture diameter ratio of approximately 0.9 or 90%. A mask/aperture diameter ratio of 0.9 provides a relatively uniform response over a relatively large range of the angle φ while maintaining an acceptable range of operation. Further, the disk-shaped mask M is spaced away from the aperture 22 by approximately 0.3 inches, resulting in a mask distance to aperture diameter ratio of approximately 0.2 or 20%.

The arrangement of FIG. 10 may be enclosed in a cover, e.g., dome 38, to protect the interior components. Moreover, the arrangement of FIG. 10 shows the point element 12 being mounted but rather below the mask M and baffle 41, outside of the cavity 16. Connection wires 40 from the point element 12 may be inserted through bores provided in the mask and baffle.

With the point element 12 facing the aperture 22 from the underside of the mask M, "hot spots" that may result from direct angles of radiation or detection into the cavity 16 can be substantially avoided. By "inverting" the point element 12, effects of Fresnel reflection, which would otherwise increase the cosine dependence of the arrangement profile, may also be avoided. Fresnel reflection generally occurs whenever light travels through a surface between two materials having different indices of refraction, for example, air and glass or silicon. Much like the cosine dependence of the Lambertian surface on the angle φ discussed above, Fresnel reflection increases with the angle φ, which decreases the illumination intensity of light in the horizon district.

The arrangement of FIG. 10 illustrates the concepts used by the system. The head module H of the system 10 in certain embodiments includes an occluded and baffled emitter (distributor R) and in other embodiments, an occluded and baffled detector (detector T). Occluded and baffled distributors and detectors are disclosed, respectively, in U.S. application Ser. No. 08/590,290, filed Jan. 23, 1996, and U.S. application Ser. No. 08/589,105, filed Jan. 23, 1996, both of which are incorporated herein by reference.

Figure 27A:
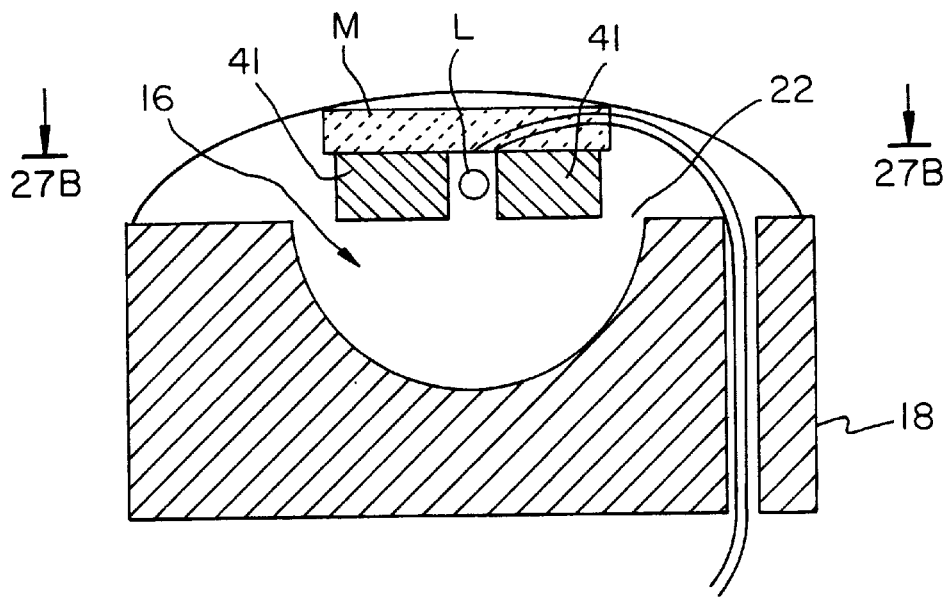
FIG. 27A is a side cross-section view of another embodiment of an optical arrangement employing the concepts of constructive occlusion and diffusive reflection, and a baffle, in accordance with the present invention.
Figure 27B:
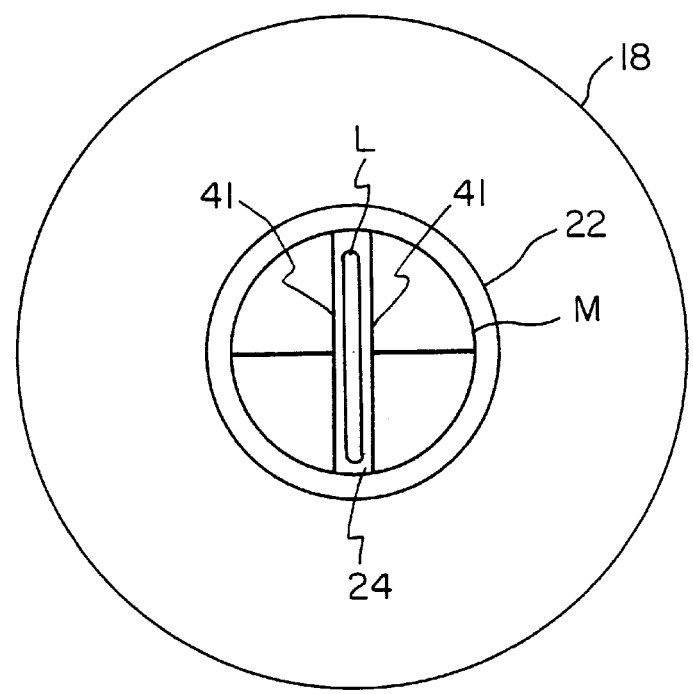
FIG. 27B is a view of the optical arrangement of FIG. 27A taken along line 27B—27B.

An alternative embodiment of an occluded and baffled emitter is shown in FIGS. 27A and 27B. An elongated lamp L, e.g., a minifluorescent lamp, is located on the underside 24 of the mask M, between two closely spaced baffles 41. Electrical power for the lamp is supplied on power leads that extend through a passageway formed in the base 18. The height of the baffles 41 exceeds that of the lamp L, such that the lamp L is not visible from the side of the emitter.

In view of the foregoing, it can be seen that constructive occlusion can render the distributor R and the detector T to provide tailored radiation and detection profiles. When desired, constructive occlusion can enhance the operation and function of the distributor R and the detector T with respect to radiation in the horizon district, or even render the distributor R and the detector T to be substantially uniformly omnidirectional over a hemispheric area. The profiles of the distributor R and the detector T can be further enhanced with the aid of the baffle. With determinative sizing and positioning of the mask and/or baffle, the distributor R can be occluded in a manner that enables it to distribute uniform intensity in almost all directions and the detector T can be occluded in a manner that enables it to respond uniformly to intensity in almost all directions. The system advantageously applies these concepts. However, where the distributor R and the detector T have been rendered omnidirectional, the system uses a head module H that is a combination of an omnidirectional device with a partitioned device that operates with axial resolution.

In order to obtain directional (or angular) data in tracking a reflector, the system employs a head module H that includes at least a partitioned distributor PR with a nonpartitioned detector T, or at least a partitioned detector PT with a nonpartitioned distributor R, where the partitioned devices operate with resolution about at least one axis. In particular, the system enables the generation and/or detection of intensity variations between different sections that are indicative of a direction along which the reflector RR1 is positioned. As a feature of the present invention, the partitioned devices function and operate in a manner that allows the system to remain relatively simple electronically and structurally, and inexpensive.

Generally speaking, where a radiation or detection surface LS as shown in FIGS. 3A and 3B is utilized in the head module H, without the cavity 16, the baffle 41 effectively divides or partitions the surface LS and/or a region between the mask M and the surface LS into sections in rendering a directional distributor or directional detector. In this regard, as explained below in further detail, the light source providing the radiation surface LS (or the detector providing the detection surface LS) is then configured to enable distinct radiation from (or distinguish between distinct incidental radiation on) each of the sections created by the baffle 41.

Where the radiation surface or detection surface is provided by the cavity 16 and the aperture 22, such as in the distributor R and detector T described above, the baffle 41 is modified or extended a baffle 51 to divide or partition the region into the sections that are now inclusive of a volume substantially between the cavity 16 and the mask M. In order that the partitioned distributor (or detector) be able to enable distinct radiation from (or distinguish between distinct incidental radiation on) each of the sections, the point element 12 is replaced by a plurality of point elements, each of which is associated with a distinct section.

Figure 9:
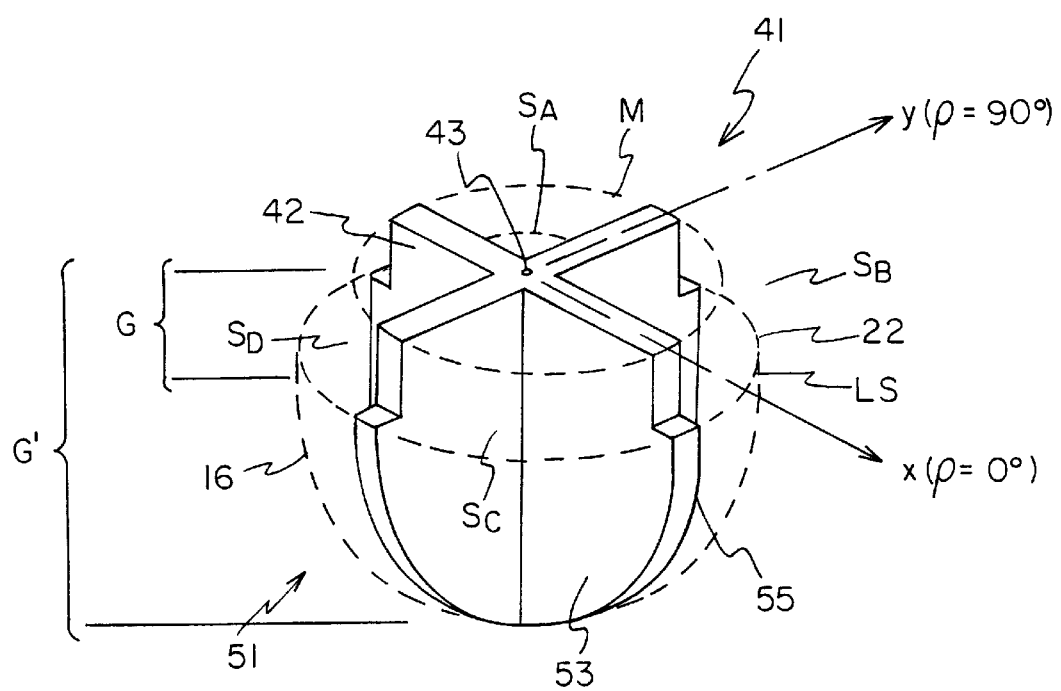
FIG. 9 is a perspective view of another intersecting baffle, in accordance with the present invention.

As shown in FIG. 9, the baffle 51 is similar to the baffle 41 of FIG. 8A, but with the addition of dividers 53 which are substantially extended portions of the planar members 42. The dividers 53 are configured such that when the baffle 51 is placed between the mask M and the cavity 16 (both represented by broken lines), the members 42 remain above the aperture 22 while the dividers 53 extend below the aperture into the cavity 16 and approach or abut the interior surface of the cavity 16. For example, where the cavity 16 is hemispherical or spherical, the dividers 53 have an curved profile 55.

Where the radiation or detection surface LS is present, a region G between the surface LS and the mask M is divided by the baffle 41 into sections $S_i$. Where the cavity 16 with the aperture 22 are utilized to provide the surface LS, a region or volume G' between the cavity 16 and the mask M is divided by the baffle 51 into the sections or subvolumes $S_i$.

In one embodiment, the baffle 41 and 51 are substantially opaque, having a thickness of approximately 3.0 mm. In an alternative embodiment, the baffles 41 and 51 need not necessarily be opaque, provided that they substantially divide the region G into the sections, such that light entering into each section substantially remains within that section only.

Where the baffle 41 or 51 partitions or divides the region into four sections $S_A$, $S_B$, $S_C$ and $S_D$, the partitioned device has resolution about two axes. Two axes of resolution can also be enabled within the system 10 where the baffle 41 or 51 partitions the region into three sections; however, it is believed that the calculations used by the system to provide directional information would be more complex. Two axes of resolution are also enabled where baffle 41 or 51 divides the region into five or more sections. If only one axis of resolution is desired, the baffle 41 or 51 is configured to partition the region into fewer sections, for example, two sections.

Where the baffle 51 provides four sections or quadrants (for resolution about two axes), an X/Y coordinate system may be superimposed on the baffle 51, as illustrated, such that the cavity 16 is quartered in accordance with the azimuth angle ρ being measured from the positive X axis. For purposes of better understanding this discussion, individual sections $S_A$, $S_B$, $S_C$ and $S_D$ may be defined as follows:

0<ρ<90=section B
90<ρ<180=section A
180<ρ<270=section D
270<ρ<360=section C

While the baffles 30, 41 and 51 all serve to increase the illumination intensity at the horizon district (i.e., φ=90 or so), the extended baffle 51 divides the cavity 16 and renders the distributor R and the detector T into partitioned distributor and detector PR and PT so that they provide resolution or distinguish direction about the X and Y axes. In particular, it is the baffle 51 which enables the partitioned devices PR and PT to generate intensity variations in a manner that allows the system to ascertain at least directional data, if not positional data for a reflector.

FIGS. 12A and 12B illustrate a partitioned device that is representative of the partitioned distributor PR and the partitioned detector PT, using the cavity 16, the mask M and the baffle 51. The baffle 51 creates the sections, which includes lower sections below the aperture 22 within the cavity 16 and upper sections above the aperture 22 and below the mask M. As mentioned, a plurality of point elements 59 are used instead of the single point element 12 of FIG. 10 and each point element 59 is associated with a distinct section. Each point element 59 may be mounted in a distinct section, in particular, a distinct upper section, on the underside 24 of the mask M for the reasons previously discussed. Again, the point element 59 may represent light-conveying devices, as described earlier.

Figure 13:
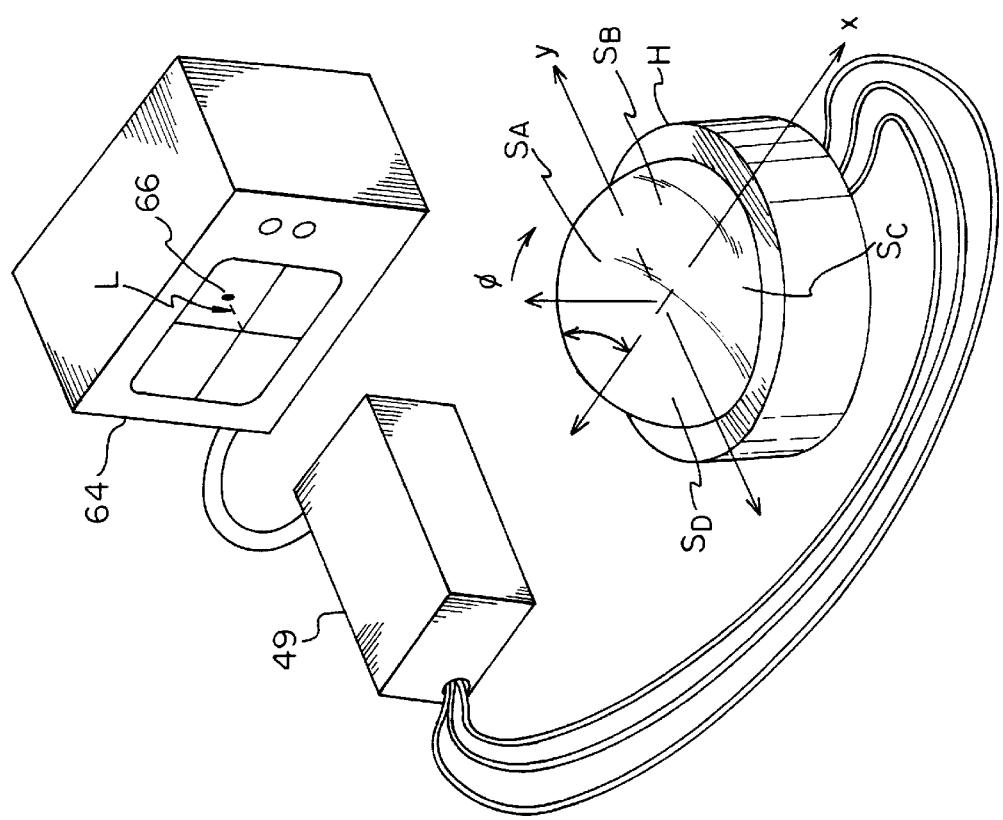
FIG. 13 is a perspective view of a head module used in association with an oscilloscope, in accordance with the present invention.

Referring to FIG. 13, the system in one embodiment provides a head module H that includes a partitioned detector PT and distributor R. The partitioned detector PT may be configured as illustrated in FIGS. 12A and 12B, and the distributor R may be configured as illustrated in FIG. 10. As explained, each point sensor 59 of the partitioned detector PT is configured to generate electrical signals based on the light intensity detected in the respective section. Where the point sensor 59 is a photodiode, the photodiode has a relatively small responsive area of approximately 0.8 square millimeters and a noise equivalent power (NEP) of approximately $6 \times 10^{-15}$ Watts/(Hertz)$^{0.5}$. A photodiode with a small responsive area has two significant advantages: (i) it generally has low noise characteristics; and (ii) the greater efficiency of the system (i.e., a decrease in the ratio of sensor size to cavity size means greater sensitivity). Using these photodiodes, the partitioned light detector's efficiency nears its asymptotic state with a cavity having approximately a 1.0 inch diameter or width.

Figure 15:
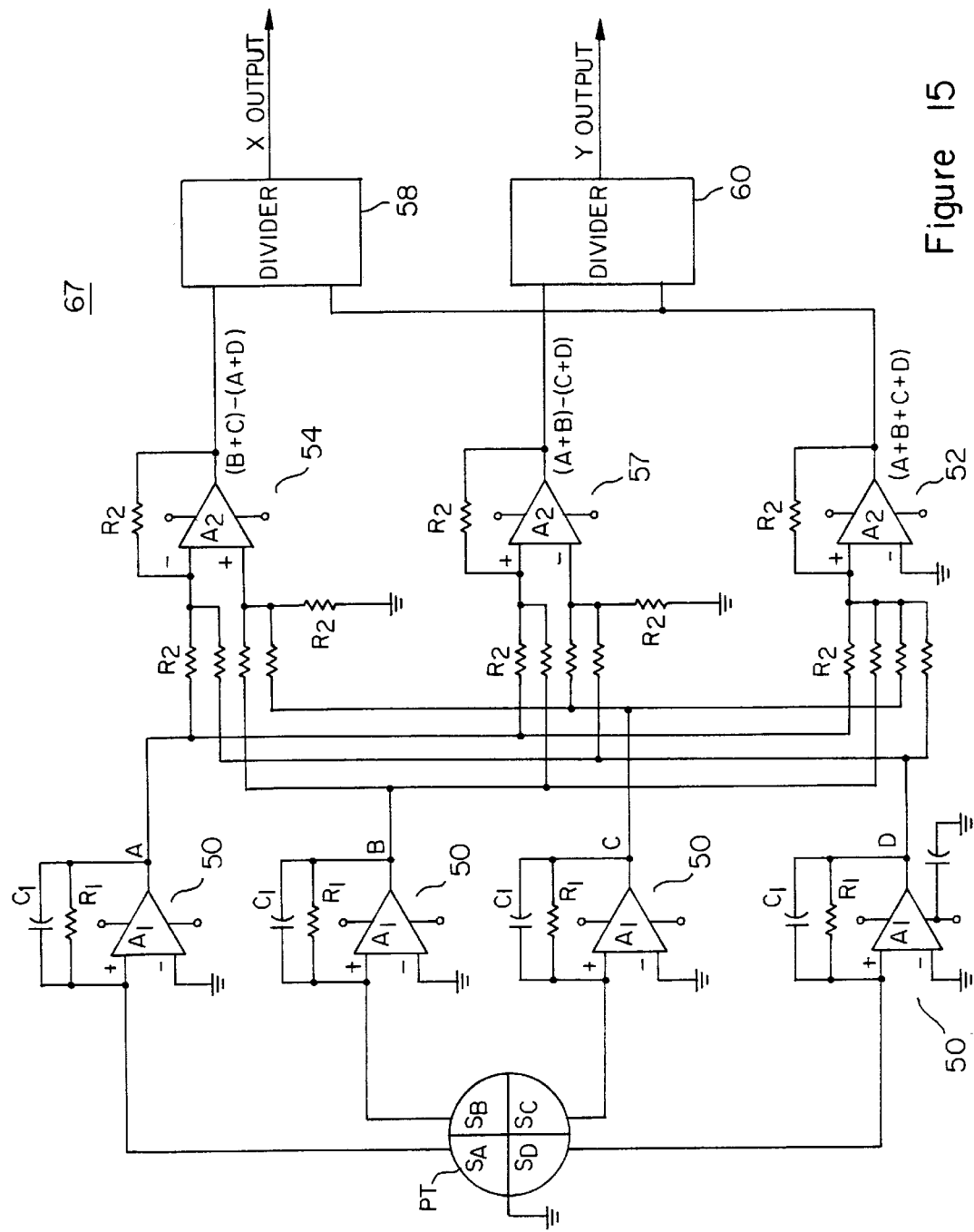
FIG. 15 is a schematic diagram of the electronics for converting electrical signal from the head module of FIG. 13, to the X-Y coordinates of the oscilloscope of FIG. 13.

As shown in FIG. 13, intensity variations detected by each of the point sensors in the partitioned detector PT of the head module H is processed by a processor 49 (a representative circuit 67 thereof being shown in detail in FIG. 15) for display on an oscilloscope 64. The circuit 67 is equivalent to the circuit suggested by a manufacturer of photodiodes, namely, United Detector Technologies (UDT) Sensors, Inc., of Hawthorne, Calif., for use with its quad-cell photodiodes. Others circuits (analog or digital) may be used.

Referring specifically to FIG. 12B, the sections $S_A$ $S_B$ $S_C$ and $S_D$ created by the baffle 51 are arranged clockwise, when viewing down on the partitioned detector PT (see FIG. 13). Note that this arrangement coincides with the sections shown in a conceptual representation in FIG. 14, in that the normal extends outwardly from the horizon (or X/Y) plane into the hemispheric area over the partitioned detector T.

Referring specifically to FIG. 15, the cathodes of the photodiodes are all connected to a common ground terminal. The anodes of the respective photodiodes are each connected to the respective current-to-voltage amplifier 50. The voltages are then summed and/or subtracted by one of three amplifiers 52, 54 and 57. The first amplifier 52 outputs a signal which is the sum of the signals from all four sections $S_A$, $S_B$, $S_C$ and $S_D$. The second amplifier 54 sums the signals from the sections B and C, and subtracts the sum of the signals from sections A and D. The second amplifier's output signal is then divided by the first amplifier's output signal by a divider 58 that provides and X output signal. A third amplifier 57 sums the signals from the sections A and B, and subtracts the sum of the signals from the sections C and D. The third amplifier's output signal is then divided by the first amplifier's output signal by a divider 60 that provides a Y output signal. A suitable divider is the DIV100 manufactured and sold by Burr-Brown® of Tucson, Ariz.

The relationship between the X and Y output signals and the section signals is given by the following formulas:

$$X=[(B+C)-(A+D)]/(A+B+C+D) \qquad \text{Eqn. 1}$$

$$Y=[(A+B)-(C+D)]/(A+B+C+D) \qquad \text{Eqn. 2}$$

It is understood by one of ordinary skill in the art that Equations 1 and 2 may be varied so long as the configuration of the sections $S_A$, $S_B$, $S_C$ and $S_D$ is consistent therewith.

The X and Y output signals are fed to the oscilloscope 64 (FIG. 13). The X output signal is connected to the display's horizontal sweep input terminal and the Y output signal is connected to the oscilloscope's vertical sweep input terminal. It is understood by one of ordinary skill in the art that the signals X and Y are not necessarily defined within a Cartesian coordinate system. A spot 66 on the oscilloscope 64 indicates the azimuth ρ and elevation φ position of the reflector. For example, the spot 64 indicated on the oscilloscope 64 is representative of a retro reflector positioned relative to the partitioned detector PT at an azimuth of about 45 degrees and an elevation of about 45 degrees. As the reflector changes elevation, the radial distance of the spot 66 from the center of the oscilloscope 64 changes. As the reflector moves azimuthally about the head module H, the spot 66 will trace a path about the center of the oscilloscope 64.

Figure 14:
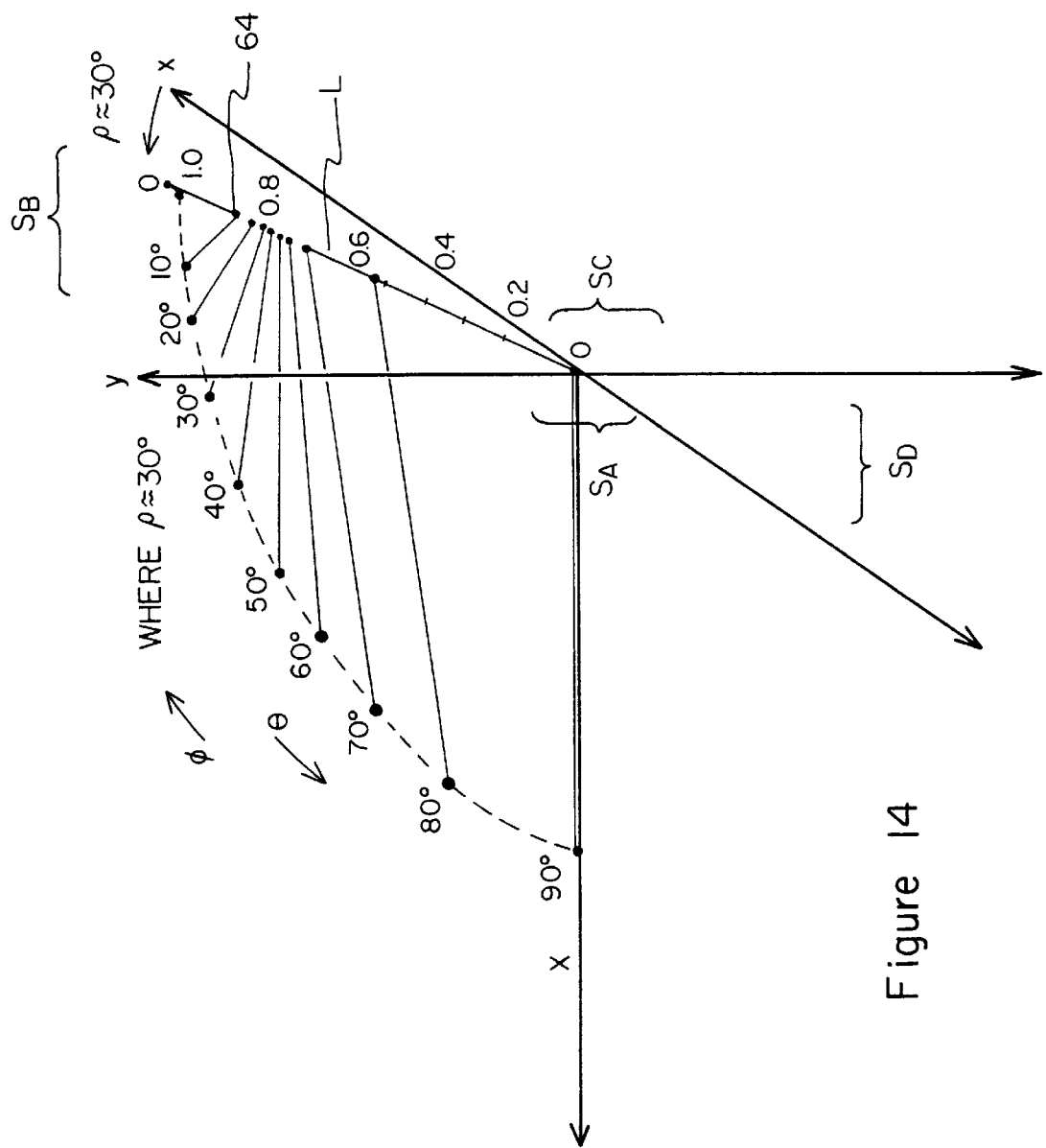
FIG. 14 is a conceptual representation of X-Y coordinates of a display of the oscilloscope of FIG. 13.

A grid conceptually representative of the coordinate system for the X and Y output signals is illustrated in FIG. 14. The azimuth (ρ) angle, taking into account the appropriate section (with the appropriately defined positive or negative values) for the reflector RR1 can be calculated from the X and Y output signals using the following formula:

$$\rho = \tan^{-1}(Y/X) \qquad \text{Eqn. 3}$$

The elevation φ is related to the radial distance or length L from the center of the oscilloscope 64 to the spot 66 (FIG. 13). This radial distance L is calculated from the X and Y output signals using the following formula:

$$L = (X^2 + Y^2)^{1/2} \qquad \text{Eqn. 4}$$

The actual elevation associated with the calculated azimuth ρ and radial length L is a complex function of the detector geometry. Accordingly, a look-up table given in Appendix A is used to correlate the azimuth ρ and the length L, to the elevation, as follows. Note, however, that the table provides the elevation angle in terms of Θ where Θ=90 −φ.

$$\Theta = \{\rho, L; \text{Table}\} \qquad \text{Eqn. 5}$$

FIG. 14 illustrates conceptually the relationship set forth in Appendix A between the azimuth ρ, the radial length L, and the elevation Θ of a retro reflector detected at the azimuth angle ρ=30. In particular, if the reflector is at an elevation of Θ=10 (i.e., near the horizon), the spot 64 will be approximately 0.89 unit length L from the center of the oscilloscope 64. If the reflector moves to an elevation of Θ=80, the spot 64 will appear to closer to the center, with a reduced unit length L of approximately 0.76 from the center. Note that so long as the retro reflector remains at an azimuth of ρ=30, the spot will also remain at an azimuth of ρ=30 on the oscilloscope 64, changing only the length L from the center to reflect the change in elevation angle. If the retro reflector moves through different azimuths while remaining at the same elevation, the spot 66 will travel on a somewhat rectangular path around the center of the oscilloscope 64. Accordingly, the system using the table in Appendix A provides a set of directional data (i.e., ρ, Θ) for a reflector being tracked.

It bears emphasis that the algorithm used in Appendix A is merely one of numerous algorithms that may be used by the system. The algorithm of Appendix A is also one of many algorithms that allows the spot 66 to remain on the display regardless of the position of the object in the detection zone Z. Moreover, it is understood by one of ordinary skill in the art that directional data may provided by the system 10 through the use of analytic relationships (e.g., polynomial equations), as opposed to the described embodiment using the look-up table of Appendix A.

In view of the foregoing, it can be seen that the partitioned light detector PT of the present invention provides at least directional information in the form of a set of azimuth and elevation coordinates (ρ, Θ) for a given retro reflector. A partitioned detector embodying features of the present invention is disclosed in U.S. application Ser. No. 08/589,104, filed Jan. 23, 1996, which is incorporated herein by reference.

Figure 28:
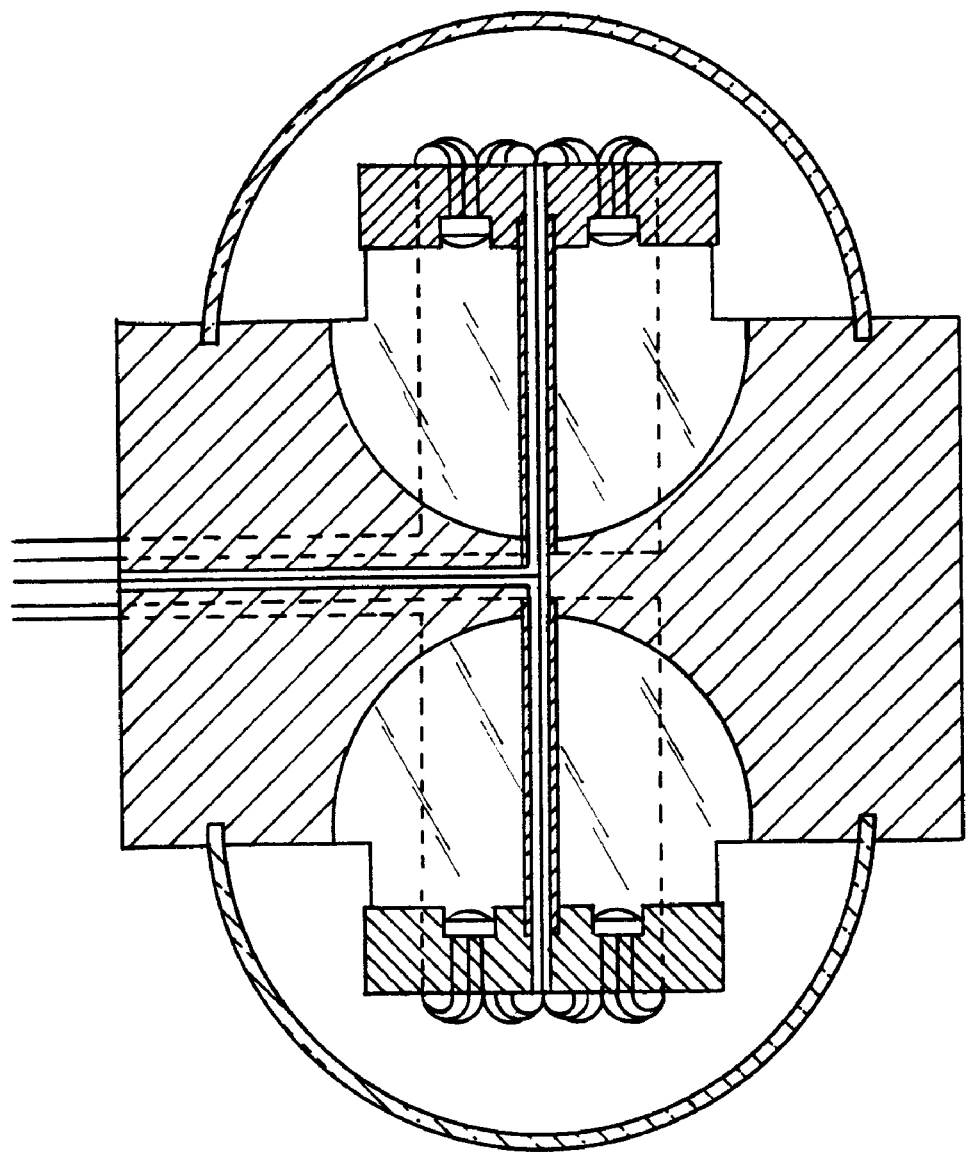
FIG. 28 is a side cross-section view of two partitioned optical arrangements configured back-to-back to provide spherical coverage in accordance with a feature of the present invention.

As an alternative embodiment of the partitioned devices in general, two partitioned devices $PD_1$ and $PD_2$ (either both distributors or both detectors) may be placed back-to-back as shown in FIG. 28, to provide spherical coverage that results from the two opposing hemispheric area of the two devices.

While the embodiment described above uses a head module having a partitioned detector with a nonpartitioned, omnidirectional distributor, the system may also use a partitioned detector with other conventional light sources under different conditions. For example, an ordinary broad band light bulb can be used where the detection zone is free from other types of illumination. Fluorescent light sources that flicker can also be used. A suitable fluorescent light bulb is the "Mini Fluorescent"™, Model BF659 in white color, made by JKL Components Corp. of Pacoima, Calif. Although conventional light sources will likely provide a nonuniform radiation profile in the detection zone Z (the profile being particularly deficient at angles of $\phi$ at or near the horizon relative to the light source), the system will function adequately for those areas substantially normal to and outside the horizon district of the light source. The use of the distributor R instead of an ordinary light source expands the operative zone of the system into a hemispheric area over the distributor R, including the horizon district of the distributor R.

In order to track multiple retro reflectors $RR_i$ simultaneously with the foregoing embodiment (see FIG. 1), that is, to provide additional sets of directional data $(\rho_i, \Theta_i)$ for additional retro reflectors (whether affixed to additional objects, or to different locations on the same object), the system necessarily distinguishes between signals attributable to distinct retro reflectors. In this regard, it is noted that the term "simultaneously" is used figuratively, and not necessarily literally, in that processing of data for multiple reflectors by the system may occur serially and not in parallel. Parallel processing may be accomplished with additional processors.

The system 10 distinguishes between multiple reflectors by using spectrally-selective sensors. In particular, where the light emitted from the distributor R is broad band light, reflectors of different spectral characteristics are provided, along with a corresponding set of spectrally-responsive point sensors (e.g., photodiodes equipped with spectrally-selective filters) for each additional reflector being tracked. With the corresponding set of point sensors tracking its "assigned" retro reflector, the system is capable of tracking multiple retro reflectors and distinguishing between the intensities variations collected for different reflectors.

Figure 17:
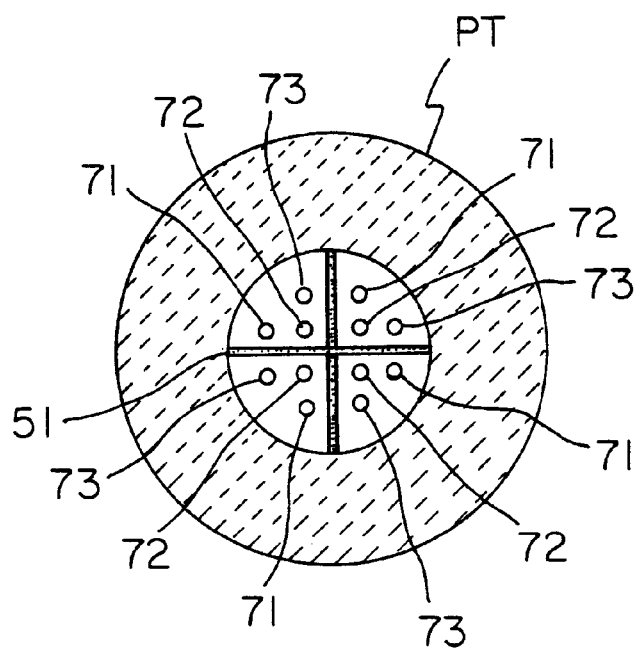
FIG. 17 is a cross-section view of FIG. 16, taken along line 17—17.

Referring to FIG. 17, multiple sets of spectrally-selective point sensors 71 and 72 (with frequencies responses of $80_1$ and $80_2$, respectively) may all be housed in a single partitioned detector PT. In particular, the sets 71 and 72 may be arranged such that each section below the mask M is occupied by one sensor from a given set. The partitioned detector PT of FIG. 17 can therefore detect at least two reflectors with frequency spectrums similar to $\lambda_1$ and $80_2$. The reflectors may each be affixed to different objects, or the reflectors may all be affixed to a single (substantially rigid) object to track its orientation.

In general, it is noted that the frequencies or spectral characteristics of the electronics described herein are not specific wavelengths, but rather denote ranges of wavelengths. The responses from the sensor sets 71 and 72 are used in Equations herein to determine the position of the corresponding reflectors. In general, the spectral characteristics of the reflectors need not be identical to the response characteristic of its "assigned" sensors, though performance of the system 10 is improved if they have similar characteristics.

Figure 22A:
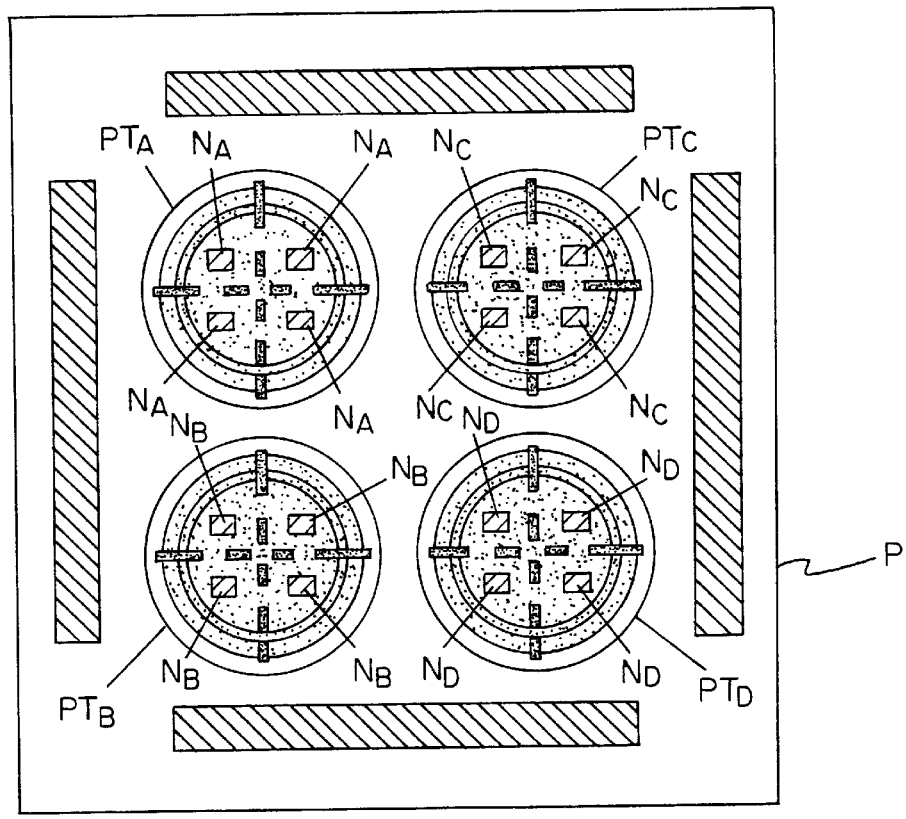
FIG. 22A is a plan view of a platform on which four individual partitioned detectors are mounted.
Figure 22B:
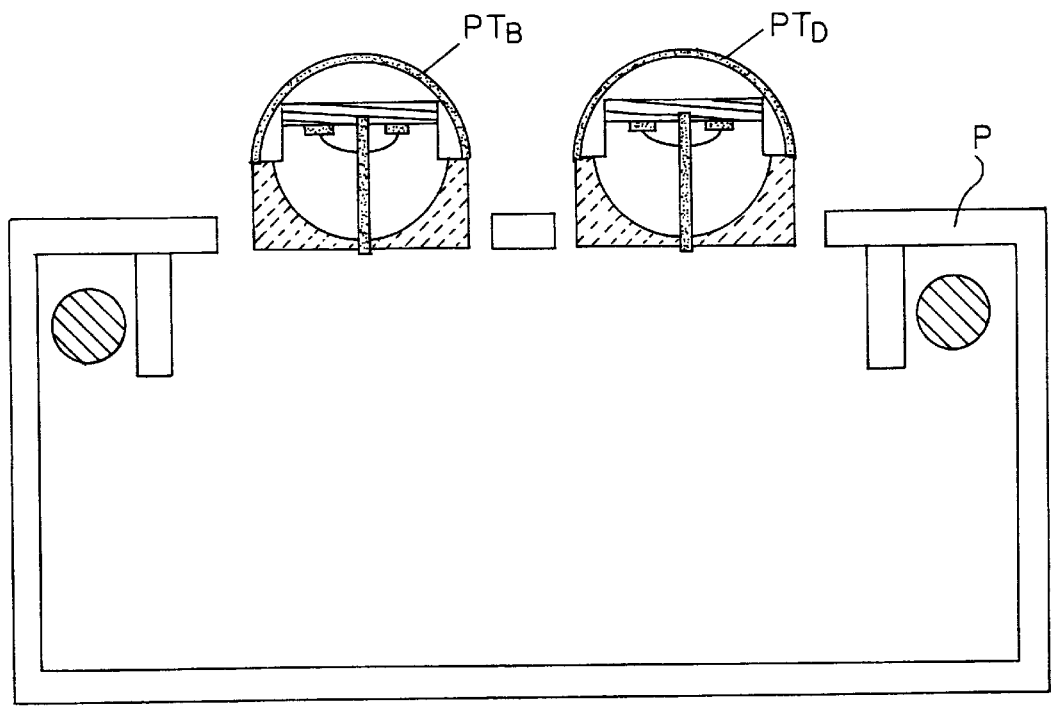
FIG. 22B is a side view of the platform of FIG. 22A.

If a third reflector is to be tracked, a third set of corresponding spectrally-responsive sensors with frequency spectrum $\lambda_4$ may be added to the partitioned detector PT of the head module H. In the alternative, an additional head module $H_n$ with simply a partitioned detector $PT_n$ may be added and used in conjunction with the head module H without requiring reconfiguration of the latter. It can be seen in general that additional sets of sensors for detecting additional reflectors may be housed in the partitioned detector of an existing head module, or in separate and distinct partitioned detectors $T_i$. As shown in FIGS. 22A and 22B, four separate and distinct partitioned detectors $PT_A$, $PT_B$, $PT_C$ and $PT_D$ are conveniently mounted on a single platform P, where each partitioned detector houses one set of sensor sets $S_A$, $S_B$, $S_C$ and $S_D$.

It has been noted that a single partitioned detector PT of the above description can provide one set of directional data $(\rho_1, \Theta_1)$ for a given reflector. Referring back to FIG. 1, where it is desirable to ascertain the position of a reflector in three dimensions (along three axes), the system uses at least one additional partitioned light detector $PT_2$ to provide a second set of directional coordinates $\rho_2$ and $\Theta_2$, which when processed with the first directional coordinates $\rho_2$ and $\Theta_2$, provides all three coordinates for the reflector. The relative positions of the partitioned detectors PT and $PT_2$ to each other is made known to the system so that it can cross-reference the signals from both partitioned detectors to ascertain all three coordinates for a reflector from two sets of directional data.

In view of the foregoing, it can be seen that to ascertain all six coordinates for an object (that is, position and rotational orientation), the system uses at least three reflectors and two partitioned detectors. However, detection of all six degrees of movement of an object is not always desirable or required, and the system 10 can be configured appropriately.

Referring to FIG. 1, where a second partitioned detector $PT_2$ is used, it is part of a second head module $H_2$ providing a second distributor $R_2$. The second distributor $R_2$ provides the light that is detected by the second partitioned detector. With the two head modules $H_1$ and $H_2$ and their relative positions known, the system can cross-reference the respective sets of directional data for any one reflector tracking the movement of that reflector in three coordinates. A divider or a separating wall (not shown) may be situated between the head modules $H_1$ and $H_2$ to prevent interference by the respective light distributors. Alternatively, the radiation from the respective distributors may be pulsed or flickered at different frequencies, e.g., 100 Hz and 130 Hz.

As shown in FIG. 1, broad band light is emitted throughout the detection zone Z. Where the detection zone Z contains extraneous objects such as furniture or walls with extensive reflective surfaces, light is reflected not only off the reflectors, but off these surfaces as well. Any light detected by the head module not attributable to the reflector contributes to the background energy which may significantly limit the performance of the system 10. However, because this background energy (also known as background or self illumination) is not a noise source, but a background source, its effects can be compensated. Where multiple sensors of different spectral responsiveness are used, this background source can be reduced if not eliminated.

Referring back to the embodiment shown in FIGS. 17A and 17B, multiple sensors of different spectral responsiveness are used, that is, sensor sets 71 and 72 responsive to frequencies $\lambda_1$ and $\lambda_2$ are used to track two corresponding reflectors, as previously described. To compensate for background illumination, a third set of sensors 73 is provided. The frequency response of the third set 73 is selected to be responsive to all wavelengths in the area of the spectrum near the frequencies $\lambda_1$ and $80_2$ so that it can act as a background nulling detector. To demonstrate the effects of background illumination, responses $r_1$ and $r_2$ of the first and second sets of sensors, after subtraction of the background energy, are given by:

$$r = K^{31\ 1}R \qquad \text{Eqn. 6}$$

Where:

$$R = \begin{pmatrix} r_1 \\ r_2 \\ \vdots \\ r_n \end{pmatrix}; K = \begin{pmatrix} 1 & K_{12} & \cdots & K_{1n} \\ K_{21} & 1 & & \\ \vdots & & \ddots & \\ K_{n1} & & & 1 \end{pmatrix}; R = \begin{pmatrix} R_1 \\ R_2 \\ \vdots \\ R_n \end{pmatrix}$$

And $R_1$ is the sensor response before background correction and $K_{ii}$ are constants of correction.

As the background level increases, the dynamic range requirements of the electronics increase. To calculate the magnitude of the self illumination, integrating sphere models are used. The background light B reflecting off the walls of a room back to the partitioned detector PT is given by:

$$B = \frac{A_e}{A_w} * \frac{W_r}{\left(1 - W_r\left(1 - \frac{A_e}{A_w}\right)\right)} \qquad \text{Eqn. 7}$$

Where $A_e$ is the acceptance area or aperture of the partitioned detector PT, $A_w$ is the area of the room walls, and $W_r$ is the room wall reflectance.

The signal from the retro reflector is given by:

$$S = L_r * Pr \qquad \text{Eqn. 8}$$

Where:

$$L_r = \frac{A_r}{2\pi D_r}; Pr = \frac{A_e}{\pi T_r}; T_r = D_r \tan\left(\frac{\Theta'}{2}\right)$$

and $\Theta'$ is the divergent angle of the retro reflector, as previously defined, $A_r$ is the area of the retro reflector, and $D_r$ is the distance to the retro reflector.

Table 1 below lists signal to background and A/D requirements for selected conditions using a 1" diameter retro reflector, where Rs is the room size in feet, $D_r$ is distance to the retro reflector in feet, and $W_r$ is the wall reflectance. A smaller signal to background required a larger Analog to Digital (A/D) converter. For a system requiring a 1° resolution, a 20 bit A/D is sufficient or a signal to background of 0.013. 20 bit A/Ds are readily available and inexpensive.

| Condition | | | Signal | Background | | |
|---|---|---|---|---|---|---|
| Rs | $D_r$ | $W_r$ | in Watts | in Watts | S/B Ratio | A/D |
| Required | | | | | | |
| 12' bit | 12' | 75% | 2.9E-6 | 2.2E-4 | 1.3E-2 | 20 |
| 12' bit | 6' | 75% | 4.6E-5 | 2.2E-4 | 2.1E-1 | 14 |

-continued

| Condition | | | Signal | Background | | |
|---|---|---|---|---|---|---|
| Rs | $D_r$ | $W_r$ | in Watts | in Watts | S/B Ratio | A/D |
| 12' bit | 6' | 95% | 4.6E-5 | 1.4E-3 | 3.3E-2 | 18 |
| 12' bit | 10' | 10% | 2.0E-6 | 8.1E-6 | 3.5E-1 | 14 |
| 24' bit | 24' | 75% | 1.8E-7 | 5.5E-5 | 3.3E-3 | 24 |
| 24' bit | 12' | 75% | 2.9E-6 | 5.5E-5 | 5.3E-2 | 18 |
| 24' bit | 12' | 95% | 2.9E-6 | 3.5E-4 | 8.7E-3 | 18 |
| 24' bit | 24' | 10% | 1.8E-7 | 2.0E-6 | 8.9E-2 | 16 |

Figure 16:
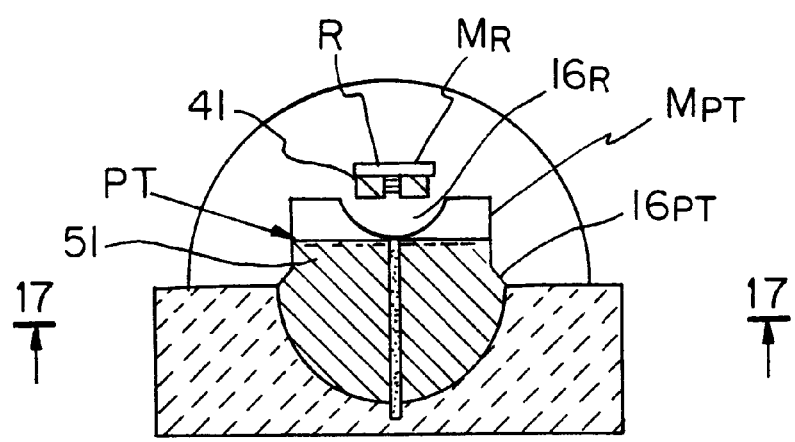
FIG. 16 is a side cross-section view of an embodiment of the head module, in accordance with the present invention.

A head module H including a partitioned detector PT and a nonpartitioned distributor R is shown in FIG. 16. The partitioned detector PT and the distributor R of this head module each has its own cavity. A cavity $16_R$, mask $M_R$ and baffle 41 are provided for the distributor R, and a separate cavity $16_{PT}$, mask $M_{PT}$ and baffle 51 are provided for the partitioned detector PT, albeit the cavity $16_R$ is actually configured in the mask $M_{PT}$ of the partitioned detector PT. Configured in this manner, the partitioned detector PT and the distributor R function without significant disturbance to the other. The distributor R distributes light into the hemispheric area over the head module H, including the horizon district around the distributor R (and the head module H). Any light reflected by a reflector in the hemispheric area is detected by the partitioned detector PT, even if reflected from the horizon district. Equipped with the extended baffle 51, the partitioned detector PT is able to detect intensity variations between the sections to enable the system to provide a set of directional data of ρ and Θ for each reflector.

The head module with separate cavities may be the simplest and least costly to manufacture. The separate cavity feature enables the use of continuous or slowly oscillating illumination and relatively larger light sources. This embodiment is advantageous in that it avoids the use of moving components and imposes relatively slow response requirements on the electronics of the system.

Figure 18A:
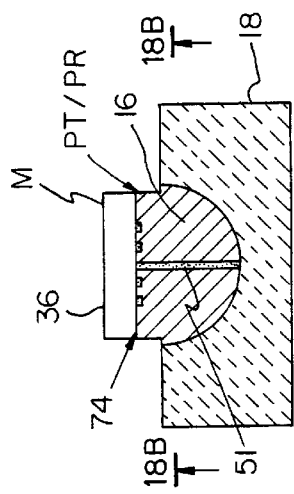
FIG. 18A is a side cross-section view of another embodiment of the head module, in accordance with the present invention.
Figure 18B:
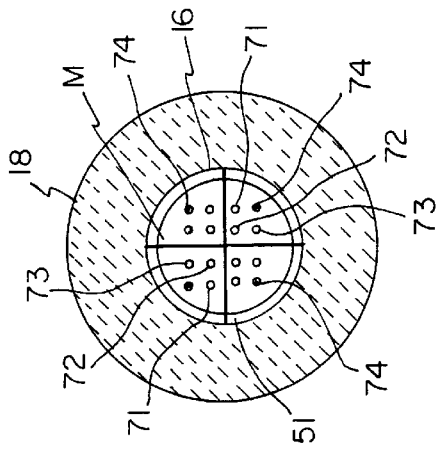
FIG. 18B is a cross-section view of FIG. 18A taken along line 18B—18B.

As a variation on the head module, reference is made to FIGS. 18A and 18B. A single cavity 16 is provided and shared by a distributor R and a partitioned detector PT. One mask M and one extended baffle 51 are used in this embodiment. The partitioned detector PT uses three sets of sensors 71, 72 and 73 to detect two reflectors (the third set 73 for background illumination). Since the distributor R shares a cavity 16 that has been divided by the baffle 51, the distributor R uses a plurality of emitters 74, one for each section under the mask M. As a further variation on the head module, the emitters 74 can be broad band pulse emitters. By measuring the time elapsed for the pulses to return to the head module H, the system can obtain a range R of the reflector from the head module H, by:

$$\text{Range} = \frac{\text{Time}}{2c} \qquad \text{Eqn. 9}$$

where c is the speed of light=$3.998 \times 10^8$ m/sec.

A pulse leading edge width or rise time of approximately 1 nanosecond would give a resolution of approximately 0.15 m or 5.8". As opposed to requiring an electronics response time of approximately milliseconds ($10^{-3}$ sec) as in the separate cavity embodiment discussed above, this embodiment typically requires an electronics response time of approximately nanoseconds ($10^{-9}$ sec). With the elapsed time measurement providing actual range data (as opposed to the representative length L discussed above), the system using this variation of the head module is able to provide all three coordinates of a reflector without using a second head module. In order to track rotational movement, the system 10 needs only two additional retro reflectors, both of which are also tracked by the head module H. It is understood by one of ordinary skill in the art that the "time of flight" variation is not limited to the single-cavity embodiment, but may also be used in the separate-cavity embodiment, described earlier.

While background illumination can be contending factor in the embodiments described above, the system can be configured to generate minimal background illumination, as discussed below.

Figure 19A:
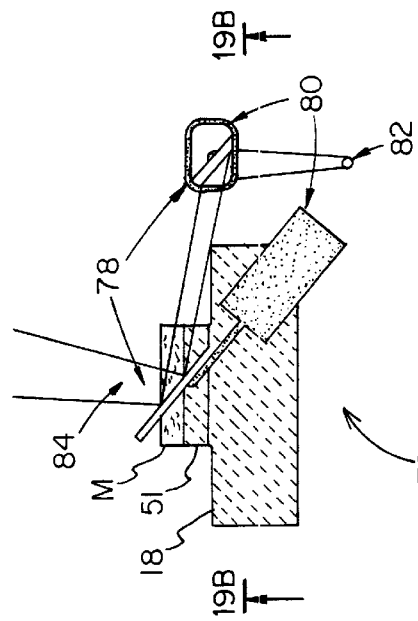
FIG. 19A is a side cross-section view of a further embodiment of the head module, in accordance with the present invention.
Figure 19B:
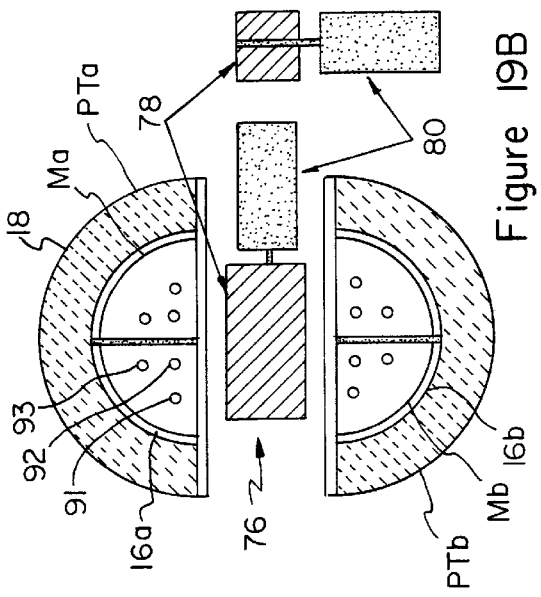
FIG. 19B is a cross-section view of FIG. 19A, taken along line 19B—19B.

Referring to FIGS. 19A and 19B, the light distributor R of the head module H is replaced by a scanning light mechanism 76. The scanning light mechanism 76 includes a plurality of scanning mirrors 78 whose movement are guided by galvanometers 80. Light from a point light source 82 is redirected by the mirrors 78 to form a scan beam 84 that sweeps the zone Z. Other types of optical scanners exist, such as rotating wedges and rotating reflectors, and may be used in the system.

The scanning beam 84 may be approximately 10 degrees wide. The beam or its sweeping action is not timed or sequenced, but simply serves to illuminate a limited section or portion of the detection zone Z at a given time. The partitioned detector PT is set with a detection threshold such that no position tracking is attempted by the system 10 if the beam strikes no reflector. When the beam 84 does illuminate a reflector, the optical intensity striking the partitioned detector PT exceeds the threshold and the system 10 processes the intensity variations detected by the sets of sensors.

The partitioned detector PT of this embodiment is split into symmetrical components. As shown in FIG. 19B, the partitioned light detector PT is divided into two portions PT$a$ and PT$b$, between which the scanning mechanism 76 is positioned. By splitting the partitioned detector PT, shadowing by the scanning mechanism 76 is significantly reduced and the partitioned detector PT remains capable of detecting radiation about two axes of resolution. The head module H of this embodiment provides only a one set of directional data (azimuth and elevation) for a reflector.

Because the scan beam 84 illuminates only a section of the zone Z at a given time, this embodiment has a distinct advantage of lower background illumination and may thus be preferred for applications with a large number of reflectors. Without the need to perform background subtraction, the system of this embodiment can readily track multiple retro reflectors using a small number of filter sensor combinations which cooperatively perform a "color" analysis on the signals detected. In fact, the system can be configured to distinguish between a very large number (i.e. thousands) of spectrally-distinguishable reflectors, using as little as two or three sets of sensors. Of course, it is understood by one of ordinary skill in the art that a larger number of sets can be used.

The color analysis performed by the system is much like that used by the human eye to detect color. The eye using only three detectors (or "cones") is able to distinguish between a variety of colors. Correspondingly, the system using only three sets of spectrally-selective sensors 91, 92 and 93 as shown in FIG. 19B, can distinguish between a variety of spectrally-distinguishable reflectors. If the scan beam 84 happens to strike multiple reflectors simultaneously, the system can process the signals in a manner much like that used for compensating background illumination, described above.

The system also uses color analysis in another embodiment. Referring to FIGS. 20A and 20B, the system 10 includes a head module H having a nonpartitioned detector T and a partitioned distributor PR, with separate cavities $16_T$ and $16_{PR}$, separate masks $M_T$ and $M_{PR}$, a baffle 41 and a cavity dividing baffle 51. The partitioned distributor PR is equipped with different color lamps $C_A$, $C_B$, $C_D$ and $C_D$ to radiate a different color (i.e., radiation of a different wavelength) from each section. The resulting color mix reflected by a reflector is detected by the detector T using three single point sensors 95. The system analyzes the color mix detected by the detector T to obtain a set of directional data (azimuth and elevation) for that reflector.

Additional reflectors may be tracked where the reflectors are equipped with shutters, such as LCD shutters. This allows this embodiment of the system 10 to distinguish between multiple points, e.g., by timing the shutters so that the light data transmitted by each reflector is transmitted as pulse data at different pulse rates.

Still referring to FIGS. 20A and 20B, the partitioned distributor PR in an alternative embodiment may be equipped with emitters of different temporal frequency. That is, each section of the partitioned distributor PR may house a lamp or emitter that flickers at a distinct frequency so that the nonpartitioned detector T is able to distinguish between light from each lamp or emitter.

While the above embodiments of the present invention are configured as optically-passive systems, the invention may also be configured as an optically-active system. Referring to FIG. 21, active light sources $88_1$ and $88_2$, such as LEDs, replace the optically-passive reflectors (thereby obviating the use of a light source or light distributors). With one partitioned detector $PT_1$, directional data for each of the sources $88_1$ and $88_2$ is obtained. With two partitioned detectors $PT_1$ and $PT_2$, positional data in all three coordinates for both of sources $88_1$ and $88_2$ obtained. The active light sources are distinguishable from each other by emitting distinguishable colors, or oscillating at distinguishable frequencies.

As another optically-active embodiment of the present invention, the system 10 includes the partitioned distributor PR of FIG. 20B, and the partitioned detector PT of FIG. 17. The partitioned distributor PR with the color lamps $C_A$, $C_B$, $C_D$ and $C_D$, or emitters of different temporal frequencies, as described above, may itself be mounted on or otherwise attached to the object being tracked. The resulting color mix from the partitioned distributor PR is detected by the sets of sensors 71, 72 and 73 of the partitioned detector PT of FIG. 17, which now perform a color analysis on the color mix to provide a set of directional data for the object relative to the partitioned detector PT.

It is noted that the accuracy of the directional performance of the light distributor and/or light detector can be empirically optimized using a variety of parameters. For example, the height, relative diameter, thickness, and reflectivity of the mask, the width and reflectivity of the shoulders, the height and reflectivity of the baffle assembly, the shape and reflectivity of the cavity, and the photodiode's diameter, all affect the light detector's directional response. Conversely, the distributor's and/or the detector's directional performance can be tailored to be nonuniform, if desired, by varying specific parameters. For example, decreasing the distance between the mask and the aperture will decrease the spherical profile of the detector's response, while increasing the detector's "on-axis" efficiency. When the mask is placed in the plane of the aperture, the detector's "on-axis" efficiency improves to about 90%, compared to about 40% with a mask above the aperture, but its response profile is narrowed, rendering a less uniform detection profile. The light detector's spectral response can also be tailored by using spectrally selective paint on the diffusely reflective surfaces or a filtered dome or cover.

Referring back to FIG. 1, for all the embodiments discussed above, the signals representative of the position of the object tracked can be converted into video signals to drive a video monitor displaying the position or movement of the object. The reflectors may be removably affixed to the object, such that they can be readily transferred between different game equipment, such as game swords or game boxing gloves.

Figure 23A:
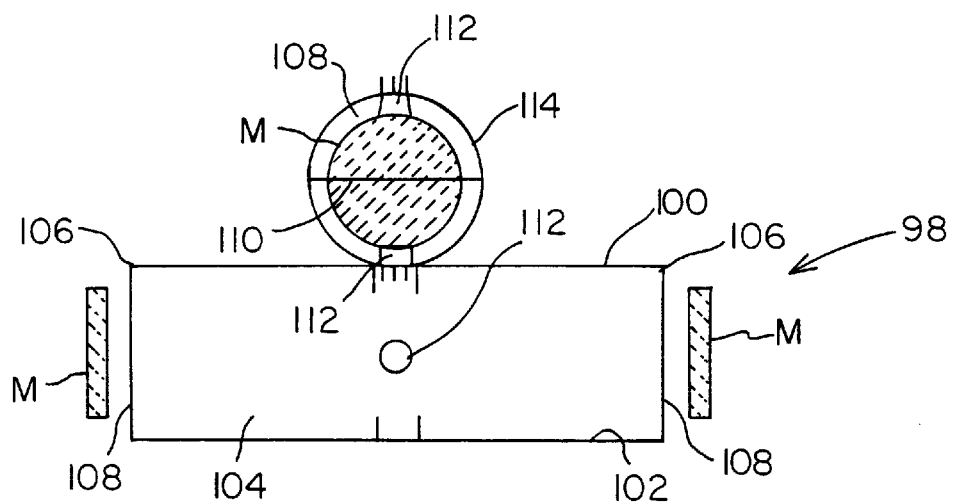
FIG. 23A is a top plan view of another embodiment of an occluded device in accordance with the present invention.
Figure 23B:
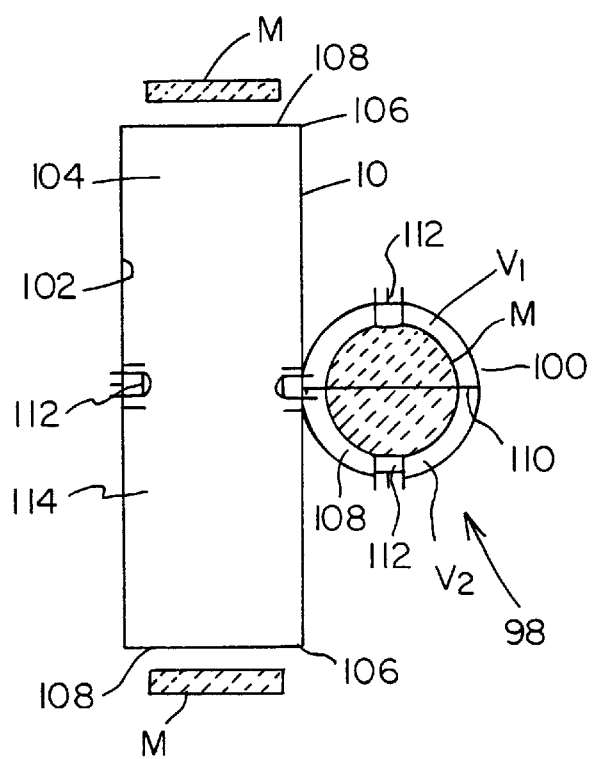
FIG. 23B is a side view of the occluded device of FIG. 23A.
Figure 23C:
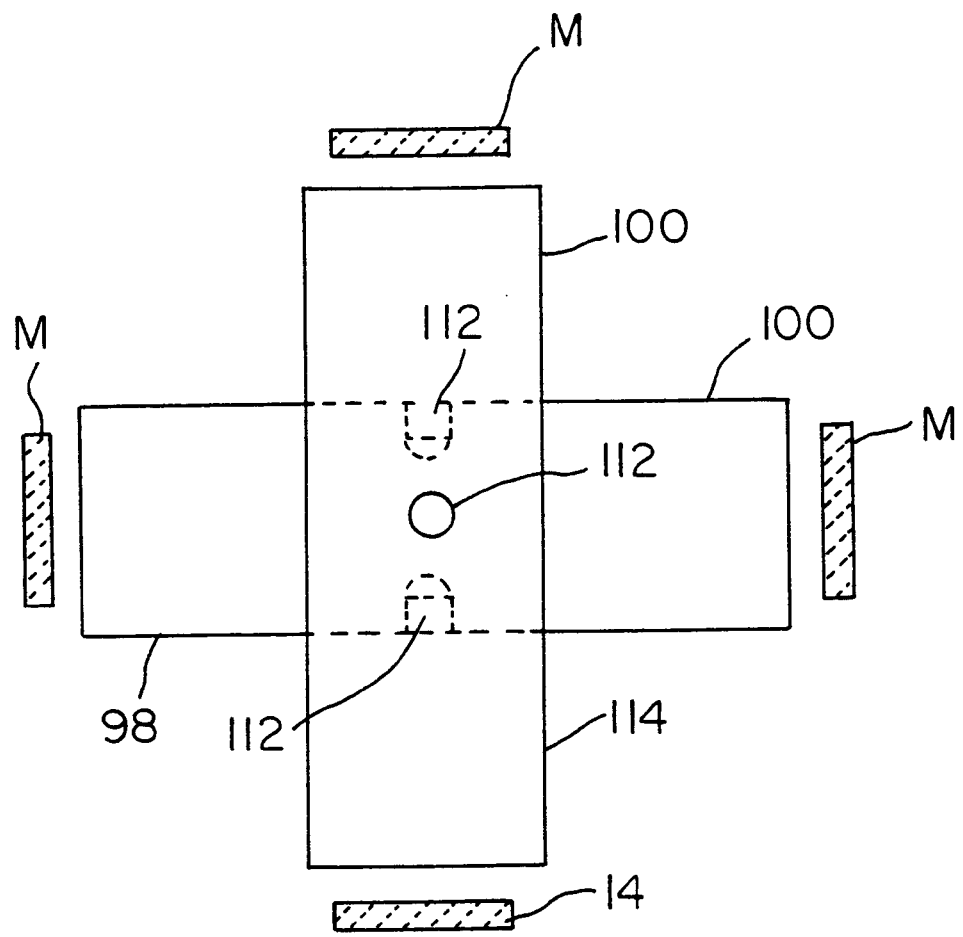
FIG. 23C is a side view rotate 90 degrees from the view of FIG. 23B.

As further embodiments of the system, an occluded distributor or detector 98 may be configured to provide to a radiation or detection profile that is substantially uniform over a spherical area. As illustrated in FIGS. 23A, 23B, 23C, the occluded device includes a tubular member 100 having a diffusely reflective interior surface 102 defining an interior volume or cavity 104. The tubular member 100 is illustrated with a cylindrical configuration; however, the member 100 need not have a circular cross section. The tubular member 100 has open ends 106 providing two apertures 108 from which radiation may enter into or exit from the cavity 104. The apertures 108 are constructively occluded with masks M and the cavity 104 is divided by a planar baffle 110 to form two half volumes $V_1$ and $V_2$ inside the tubular member 100. A point element 112 is housed in each half volume, at a midlocation along the length of the member 100. Accordingly, the device 98 is operational with respect to one axis of resolution.

Where the point element 112 is an emitter, radiation is emitted from each end 106 of the occluded device 98 with a tailored distribution profile over the aperture 108. Correspondingly, where the point element 112 is a detector, the occluded device 98 detects radiation with a tailored detection profile over the aperture 108.

For substantially spherical coverage, a second occluded tubular device 114 is provided. The second device 114 is structured similarly to the first device 98 and thus like numerals refer to like elements. The second device 114 is positioned orthogonally to the device such that its apertures 108 are offset substantially 90 degrees from the apertures 108 of the first device. As the device 114 is also divided by the planar baffle 110, the two devices together are operational with respect to two axes of resolution.

Additionally, the concept of constructed occlusion can be accomplished by reconfiguring the substantially Lambertian surface into multiple distinct surfaces which can alternatively occlude each other. As illustrated in FIGS. 24A–24D, an annular or ring structure 120 is illustrated, having an opening or otherwise nonoptical area 122 through which an axis or boresight 124 can be drawn. It is understood by one of ordinary skill in the art that the area 122 may alternatively be non-reflective and/or nontransmissive. The axis 124 is substantially normal to a plane within which the ring structure 120 is confined. The elevation angle φ is defined as the angle from the boresight 124.

The ring structure 120 provides two distinct surfaces that can either radiate or detect light. In particular, the ring structure 120 includes a first annular structure 126 that provides a first surface 128 that faces inwardly toward the area 122. The ring structure 120 also includes a second annular structure 130 (shown in exploded view in broken lines in FIG. 24A) that provides a second surface 132. The second structure 130 fits within the first structure 126 and may reside at any predetermined depth within the first structure 126 as shown by the arrow 123. Fitted inside the first structure 16, the second structure 130 effectively projects angularly from the first structure 126 with the surfaces 128 and 132 being angularly offset from each other. In one embodiment, the first and second surfaces are normal to each other, with the second surface 132 being substantially parallel with the plane of the area 122 and thus substantially normal to the boresight 124. While this may offer the simplest configuration, the first and second surfaces 128 and 132 need not be normal to each other so long as they can occlude each other as desired and any angle therebetween is known. Typically mutual selective occlusion is afforded if the structures 126 and 130 are nonparallel. Moreover, the second surface 132 need not be normal to the boresight 124 so long as any angle therebetween is known.

Figure 24C:
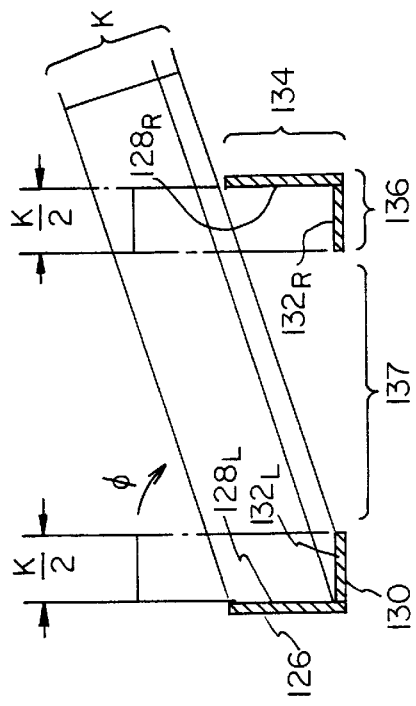
FIG. 24C is a cross section view of the ring detector of FIG. 24A, demonstrating the substantially constant cross section area provided thereby.
Figure 25C:
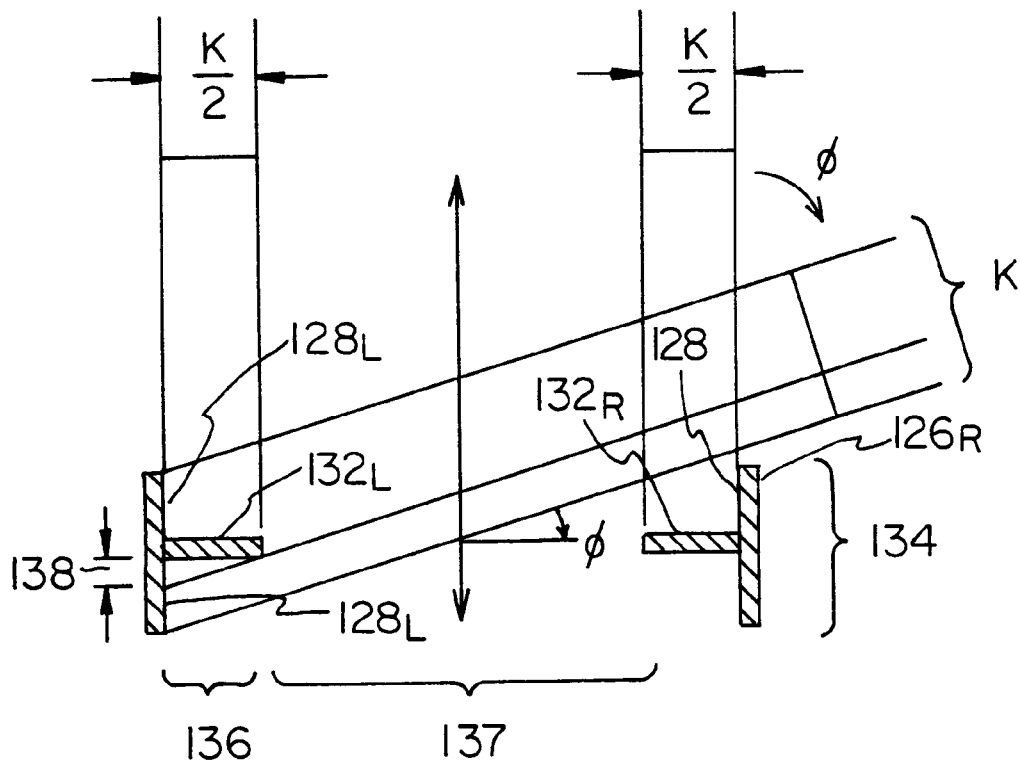
FIG. 25C is a side view of the ring detector of FIG. 25A, demonstrating the substantially constant cross section area provided thereby.

Referring to FIG. 24C, the second structure 130 is situated at a lower depth within the first structure 126. However, as mentioned, the second structure 130 can also be situated at a midline of the first structure 126, as shown in FIGS. 25A–25C. Depending on dimensions 134 of the first structure 126 and 136 of the second structure 130, and a spacing 137 the first and second structures, the cross section K can be kept substantially constant for most angles of φ. It can be seen that for the angle of φ approaching the horizon as shown in FIG. 24C, the first and second left surfaces $128_L$ and $130_L$ are unoccluded, whereas the first and second right surfaces are occluded, to provide the total cross section K. Where the angle of φ is substantially zero, only the second surfaces $130_R$ and $130_L$ are unoccluded, whereas both the first surfaces $128_R$ and $128_L$ are effectively occluded to provide the total cross section K.

Accordingly, the first and second structures 126 and 130 each constructively occludes the surfaces of the other for different angles of φ, keeping the cross section area K relatively constant to provide a relatively uniform radiation or detection profile. Like the occluded devices described earlier, the ring structure 120 is substantially omnidirectional for either radiation purposes or detection purposes.

Where the second structure 130 is at a mid-depth in the first structure 126, the cross section K also remains relatively constant for different angles of φ. As shown in FIG. 25C, the left second structure $130_L$ constructively occludes or masks a portion 138 of the left first surface $128_L$, while the right first structure $126_R$ completely occludes the right second surface $132_R$. Accordingly, the first and second structures 126 and 130 each constructively occludes the surfaces of the other for different angles of φ, keeping the cross section area K relatively constant to provide a relatively uniform radiation or detection profile. In FIGS. 24A–24C and 25A–25C, the structure 120 is configured as a circular ring; however, it can be configured in any shape, provided the opening or nonoptical area 122 is present.

Figure 24B:
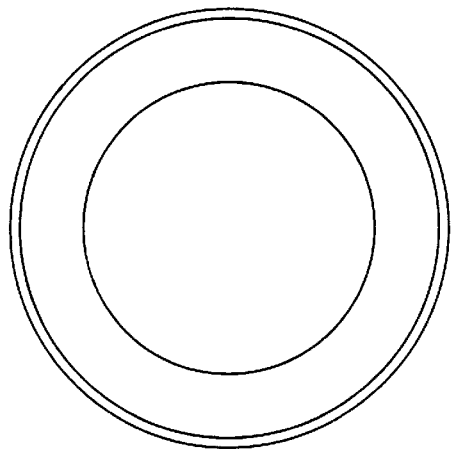
FIG. 24B is a top plan view of the ring detector of FIG. 24A.
Figure 24A:
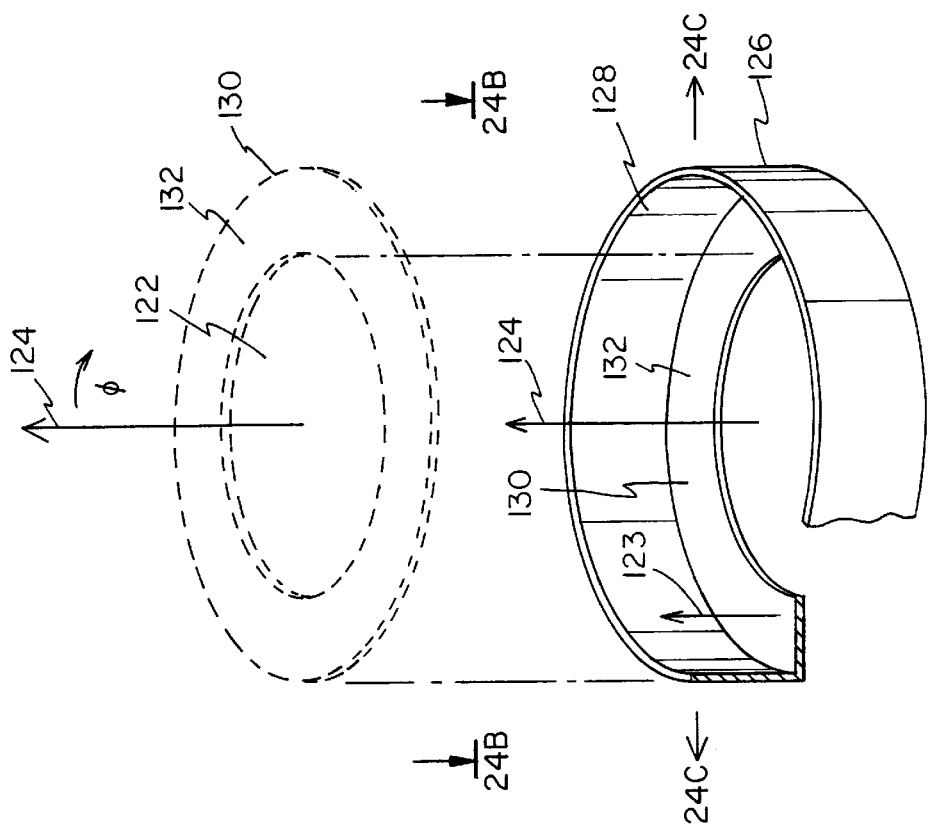
FIG. 24A is a perspective view of a ring detector in accordance with the present invention.

Referring to FIGS. 25A–25C only, to provide at least one axis of resolution in rendering the structure 120 directional in one coordinate, the structure 120 is divided into at least two discrete portions or segments 150. The disclosed structure 120 of is divided into four segments 150*a*, 150*b*, 150*c* and 150*d*, as best shown in FIG. 24B, to provide two axes of resolution rendering the structure 120 directional in two coordinates, in the manner described earlier.

In FIG. 25A, the segment 150*d* is shown partially broken away to reveal the cross section view of segment 150*a* which is representative of all the segments 150*a*–150*d*. The division in the structure 120 is preferably, but not necessarily, made so that each segment provides substantially symmetrical and equal surfaces 128 and 132. In this embodiment, the segments 150a–150d are insulated from each other by gaps 152 filled with air or insulating material such that each segment is unaffected by the radiation or detection function of the others.

With the structure 120 as a radiator or emitter, each of the segments can radiate distinguishable radiation. With the structure 120 as a detector, the structure 120 is electrically configured such that each segment 150a–150d can generate signals representative of the radiation incident on the respective segment.

Figure 29A:
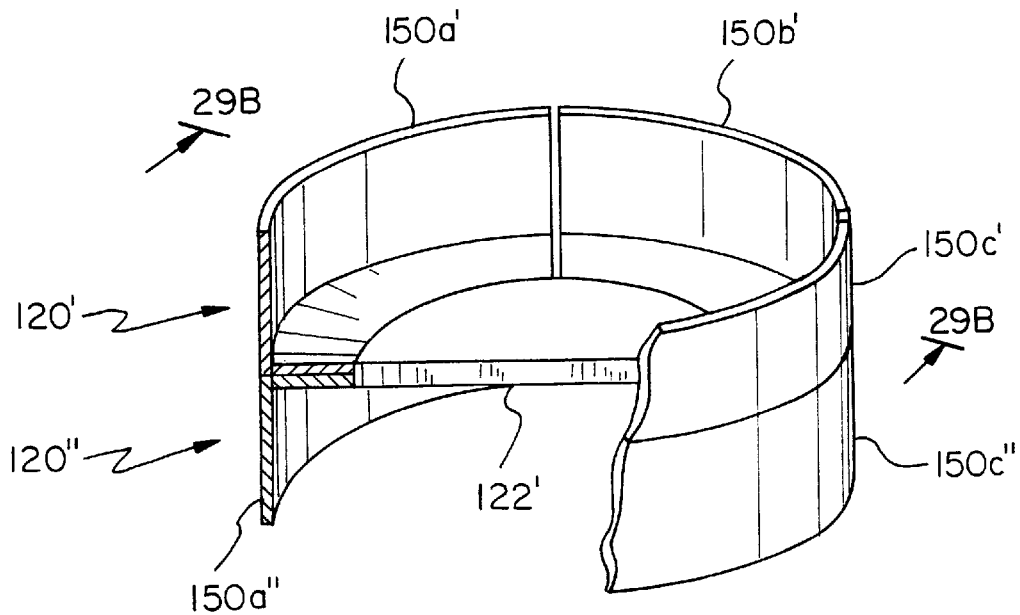
FIG. 29A is a perspective view of two sectioned ring detectors configured back-to-back to provide spherical coverage in accordance with the present invention.
Figure 29B:
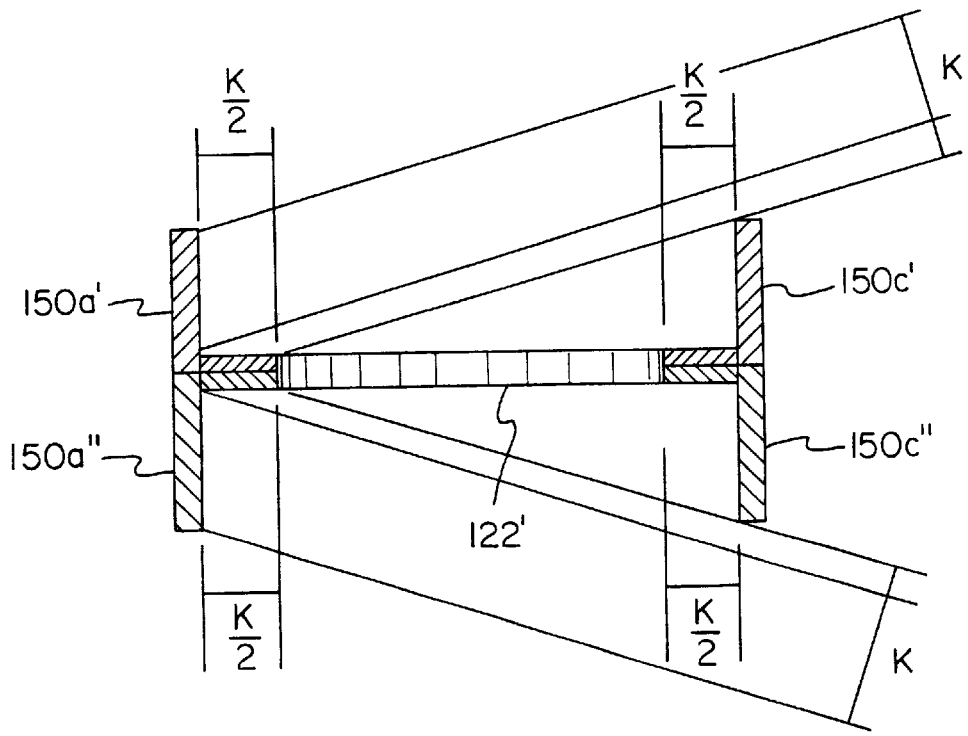
FIG. 29B is a side cross section view of the ring detectors of FIG. 29A.

As a further variation, the structure 120 can be constructed out of silica, or a calorimetric substance that is sensitive to infrared radiation. In that regard, the first and second surfaces 128 and 132 may be rendered a dark shade or color such that infrared radiation incident on the structure 120 is readily detected.

Where spherical coverage is desired or appropriate, two ring structures 120' and 120" may be used in a back-to-back configuration as shown in FIGS. 29A and 29B. In the illustrated embodiment, a single non-reflective and non-transmissive member 122' is provided between the two structures 120' and 120" and each of the structures 120' and 120" is divided into the segments 150a'–150d' and 150a"–150d", respectively, to provide resolution about two axes (the segments 150d' and 150d" are not shown and the segments 150c' and 150c" are shown partially broken away).

In the orientation of FIGS. 29A and 29B, it can be seen that the ring structure 120' provides "top" hemispherical coverage and the ring structure 120" provides "bottom" hemispherical coverage, which together provide the spherical coverage.

Figure 26B:
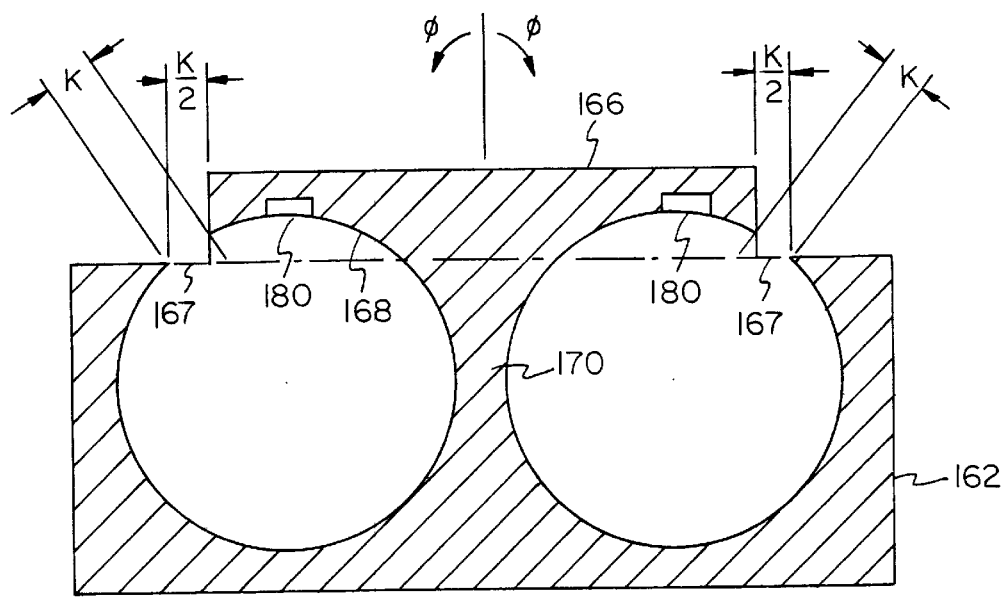
FIG. 26B is a side cross-section view of the device of FIG. 26A, taken along line 26B—26B.
Figure 26A:
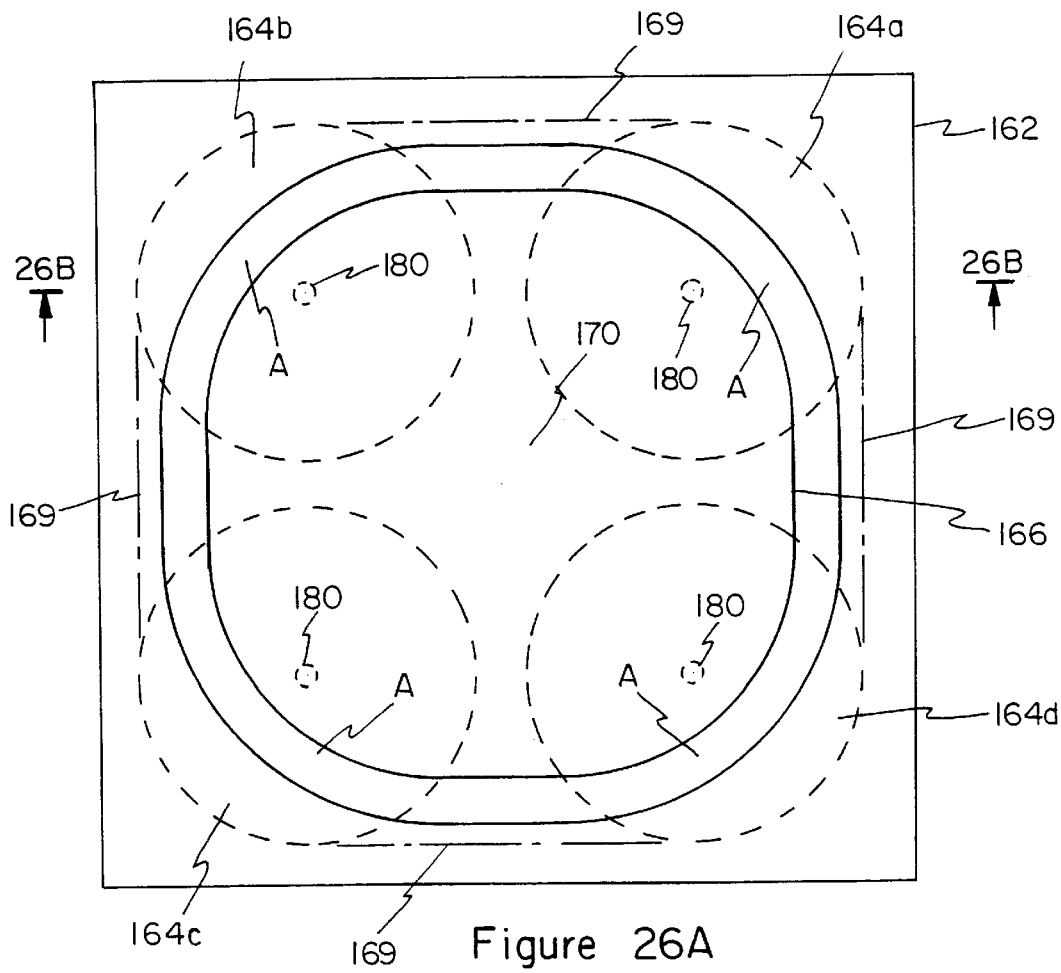
FIG. 26A is a top plan view of a multiple cavitied optical device in accordance with the present invention.

Referring to FIGS. 26A and 26B, another embodiment of a constructively occluded, directional optical device 160 is illustrated. The device 160 includes a base 162 constructed much like the base 18 earlier described, except that the base 162 contains four spherical cavities 164a, 164b, 164c and 164d, all of which are constructively occluded by a mask 166 configured from an upper portion 168 of the base 162. Each of the spherical cavities has a surface or aperture 167 that is occluded by the mask 166 so that the cross section area K remains substantially constant for most angles of $\phi$. A plurality of optical point elements 180, either emitters or detectors, are provided, with each being associated with a distinct cavity.

Described another way, it can be seen that the four spherical cavities 164a–164d jointly form a larger cavity (delineated in FIG. 26B by broken line segments 169) which has been partitioned by a core section 170 of the base situated between the four spherical cavities, on which the mask M is supported. The core section 170 acts much like the baffle 51 described earlier in enabling the radiation in each cavity 164a–164d to remain therein. With the four spherical cavities, the device offers two axes of resolution, as described earlier.

As mentioned, the radiation or detection profile of an occluded device in accordance with a feature of the present invention can be tailored as desired or needed. As an example of an occluded device providing a nonuniform, tailored radiation or detection profile, reference is made to FIGS. 30A–30C. An occluded device 200 is shown, having a diffusely reflective cavity 202, which in the illustrated embodiment, is cylindrical with a constant circular cross-section area 204. An aperture 206 of the cavity 202 provides a radiation or detection surface 208. The occluded device 200 includes a diffusely reflective mask M.

In this embodiment, the mask M has a width $W_M$ that is greater than a width $W_A$ of the aperture 206 and is positioned a distance D from the surface 208 or aperture 206. For example, the width $W_M$ may be approximately 0.265", the width $W_A$ may be approximately 0.250", and the distance D may be 0.075". In this embodiment, the mask M overreaches and extends beyond the aperture 206. With the mask M so configured, it can be seen that a cross section area $K_H$ for angles of $\phi$ in the horizon district is substantially at a maximum, and is reduced to a cross section area $K_E$ as the angle $\phi$ is reduced. In fact, for angles of $\phi$ approaching zero (i.e., normal to the aperture 206), the cross section K is zero, as the mask M completely occludes the aperture 206. Accordingly, the device 200 has reduced function in the elevation angles over the hemispheric area or sector which the device 200 faces. But because the cross section area $K_H$ is substantially at a maximum and remains substantially at the maximum for all azimuth angles (i.e., $0<\rho<360$), the device 200 is rendered an azimuthal device having a radiation or detection profile that is substantially uniform in the azimuth direction at or near the horizon district of the device 200.

To provide resolution about at least one axis in the azimuth direction, the device includes a diffusely reflective baffle 214 that partitions or divides the cavity 202 into the sections S. Referring specifically to embodiment of FIG. 30B, the baffle 214 preferably, but not necessarily, divides the cavity 202 into four section $S_A$, $S_B$, $S_C$ and $S_D$. As an emitter, the device 200 may then include four emitters $220_A$–$220_D$, each of which is housed in a distinct section. Much like the hemispherical partitioned distributor PT of FIGS. 20A and 20B, described earlier, the emitters 220 can be lamps of different colors or different temporal frequencies, except that the device 200 operates azimuthally, as opposed to hemispherically.

As a detector, the azimuthal device 200 may include a plurality of detectors (also represented by reference numerals 220) in association with the sectors. For the device 200 to locate the azimuthal angle of incoming light over 360 degrees in its horizon district, the baffle 214 is configured to partition the cavity 202 into at least the four sections $S_A$, $S_B$, $S_C$ and $S_D$, each of which houses a distinct emitter 220.

Figure 30A:
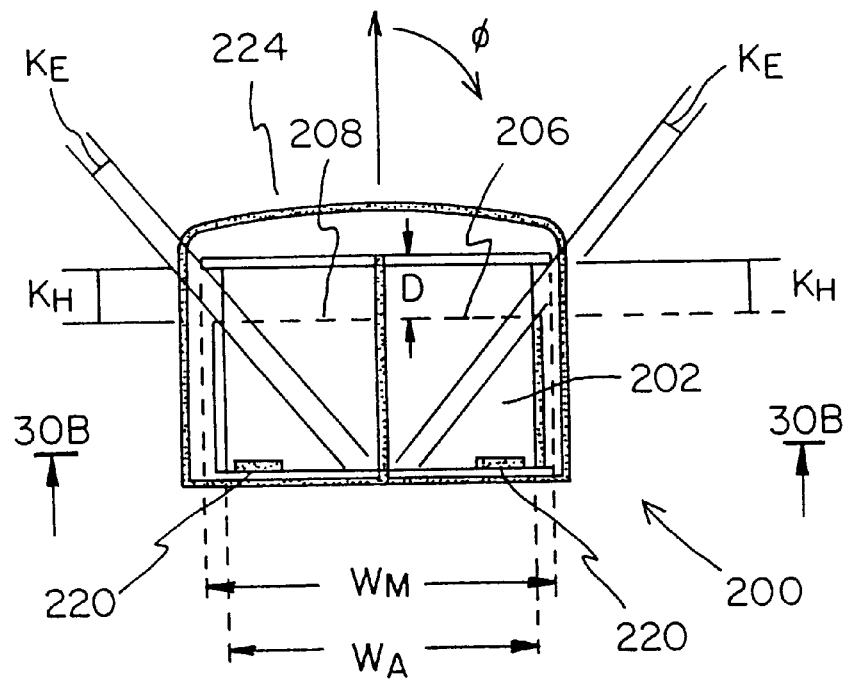
FIG. 30A is a side cross section view of one embodiment of an azimuthal device in accordance with the present invention.
Figure 30B:
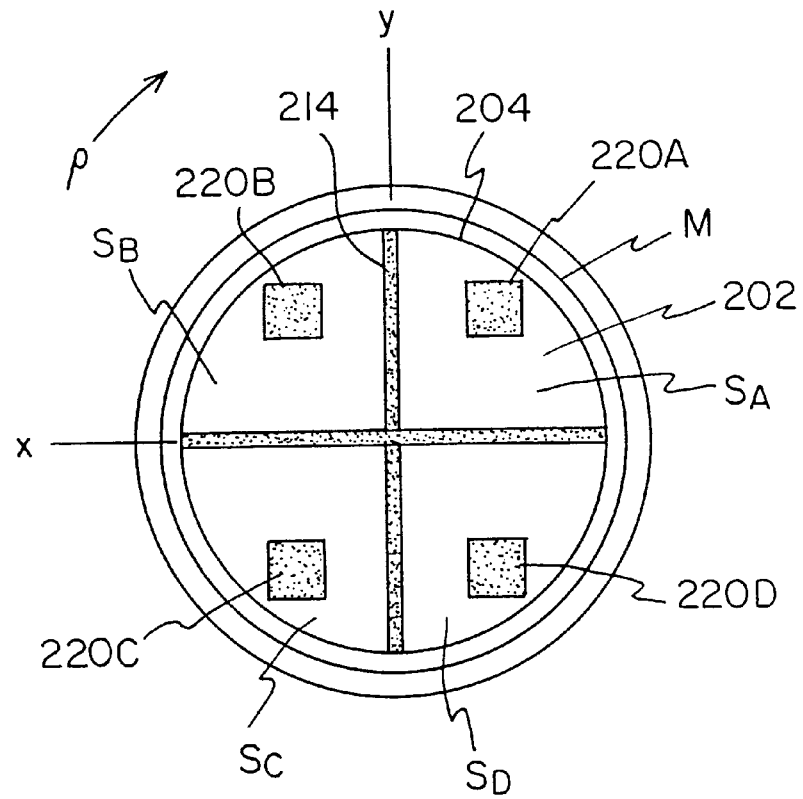
FIG. 30B is a view of the azimuthal device of FIG. 30A taken along line 30B—30B.
Figure 30C:
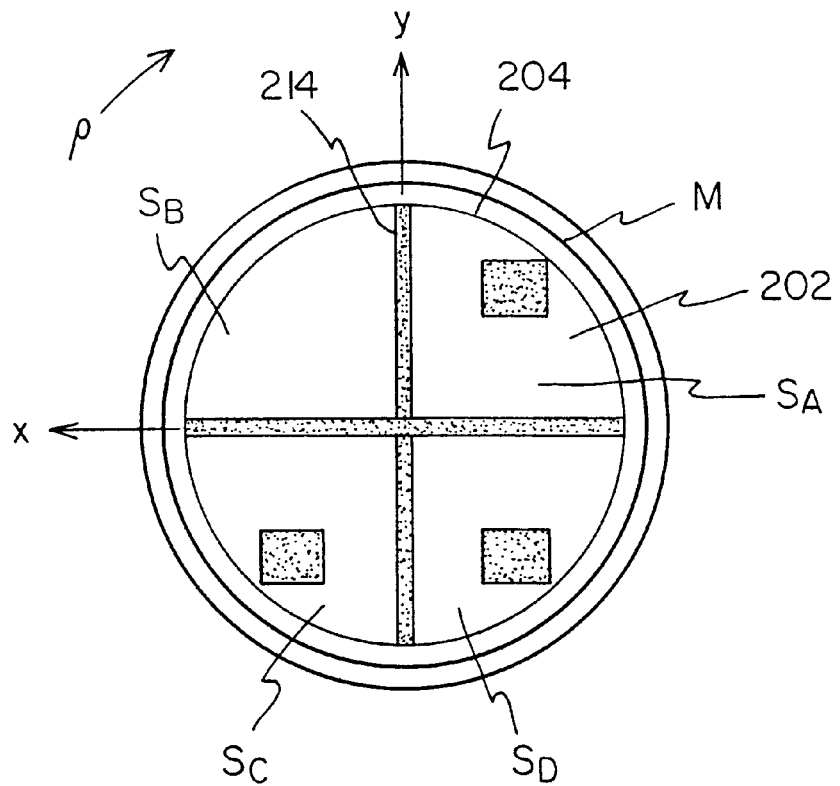
FIG. 30C is a view of the azimuthal device of FIG. 30A taken along line 30B—30B, with a tailored coverage.

For the azimuthal device 200 to locate the azimuth angle of incoming light over 180 degrees in its horizon district, the baffle 214 is configured to partition the cavity 202 into at least three sections that span preferably, but not necessarily, 270 degrees. As shown in FIG. 30C, the three sections may be sections $S_A$, $S_D$ and $S_C$, each with its respective detector 220. As a fourth detector 220 is not used in this embodiment for detection coverage of 180 degrees, the "nonactive" section $S_B$ is shown without a detector.

It is understood by one of ordinary skill in the art that the plurality of sections and/or the plurality of optical elements 220 associated with the sections S may be tailored or changed to meet the desired function and operation of the device 200 as either a partitioned azimuthal distributor or a partitioned azimuthal detector.

Figure 31A:
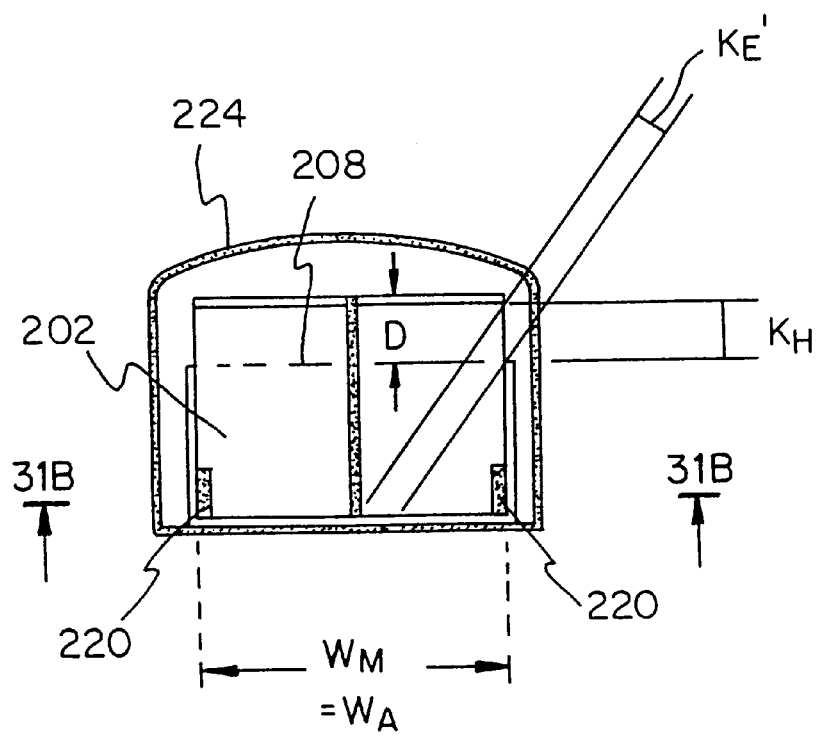
FIG. 31A is a side cross section view of another embodiment of the azimuthal device in accordance with the present invention.
Figure 31B:
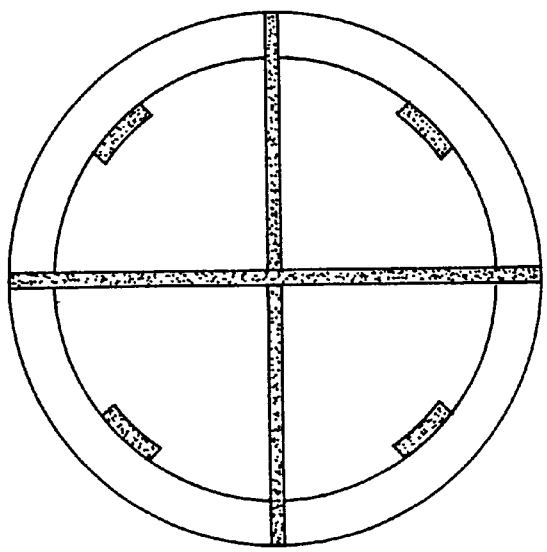
FIG. 31B is a view of the azimuthal device of FIG. 31A taken along line 31B—31B.
Figure 31C:
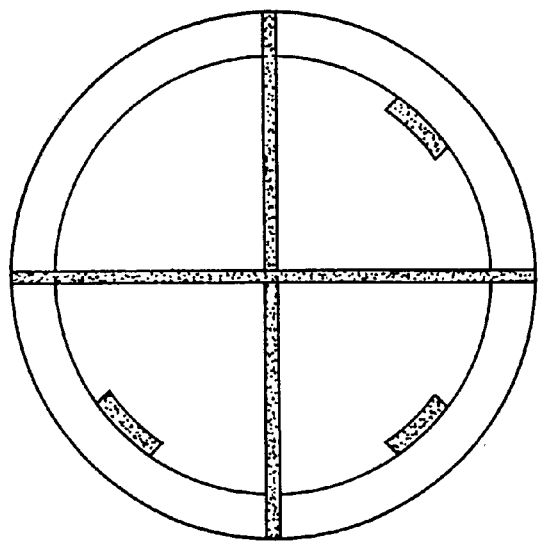
FIG. 31C is a view of the azimuthal device of FIG. 31A taken along line 31B—31B, with a tailored coverage.

As a further example of tailoring the radiation or detection profile of the azimuthal device 200, the device 200 is shown in FIGS. 31A–31C where the width $W_M$ of the mask M is substantially equal to the width $W_A$ of the aperture 206. It can be seen that the cross section area $K_H$ has remained substantially unchanged from that of FIGS. 30A–30C; however, cross section area $K_E$40 of FIG. 31A has increased over the area $K_E$ of FIG. 30A.

It is noted that the optical elements 220 of FIGS. 30A–30C are positioned in the "bottom" of the cavity 202, whereas the optical elements 220 of FIGS. 31A–31C are positioned on the "sides" of the cavity 202. In either instance, the sites of the elements 220 within the cavity 202 are selected so as to avoid "hot spots", as described earlier, if "hot spots" are undesirable or disruptive. The embodiment of FIGS. 30A–30C may be preferred for a floor-mounted azimuthal device and the embodiment of FIGS. 31A–31C may be preferred for a wall-mounted azimuthal device.

Like the embodiments described above, the cavity 202, the mask M, and/or the baffle 214 may be diffusely reflective, and the cavity 202 may be any shape, although the cylindrical shape is preferred in most instances. A protective cover 224 may also be provided.

It can be seen that the present invention provides a relatively simple and cost effective system that can track the position of objects moving in a three-dimensional zone, without a large number of optical elements or complex processing electronics. Although the foregoing discloses the presently preferred embodiments of the present invention, it is understood that the those skilled in the art may make various changes to the preferred embodiments shown and described without departing from the scope of the invention. Accordingly, the invention is defined only by the following claims.

We claim:

1. A light emitting system, comprising:
   an emitter surface facing an area to be illuminated;
   a mask positioned a predetermined distance from said emitter surface and between the emitter surface and the area to be illuminated, whereby the mask constructively occludes a substantial portion of the emitter surface with respect to the area to be illuminated;
   a baffle positioned in a region between said mask and said emitter surface, said baffle dividing said region into sections; and
   a plurality of emitters, each emitter being coupled to emit light into a distinct one of the sections.

2. A light emitting system as defined in claim 1, wherein each of the emitters emits light of a distinguishable spectral characteristic.

3. A light emitting system as defined in claim 1, wherein the emitter surface comprises a diffusely reflective cavity having an aperture.

4. A light emitting system as defined in claim 3, wherein said baffle includes an extended portion that divides said cavity.

5. A light emitting system as defined in claim 1, wherein said mask and said baffle have diffusely reflective surfaces.

6. A optical device that senses or emits light volume, comprising:
   first and second tubular members positioned substantially orthogonally to each other, each of said tubular members having an interior volume and light transmitting apertures;
   a plurality of masks, each positioned a predetermined distance from a distinct one of said apertures;
   a plurality of baffles, each positioned within a distinct tubular member subdividing said interior volume into subvolumes;
   a plurality of optical elements that either sense or emit light, each of which is positioned within a distinct subvolume.

7. A spherical optical device in accordance with claim 6, wherein each of said interior volumes is defined by a diffusely reflective surface.

8. A spherical optical device as defined in claim 6, wherein said optical elements are emitters.

9. A spherical optical device as defined in claim 6, wherein said optical elements are detectors that generate signals representative of light detected within a respective distinct subvolume.

10. A light distributor, comprising:
    a base having a reflective surface for facing toward an area to be illuminated;
    a mask positioned a predetermined distance from the reflective surface of the base and between the reflective surface of the base and the area to be illuminated, the mask having a reflective surface facing toward the reflective surface of the base;
    a diffusely reflective cavity formed in one of the reflective surfaces at a location such that an aperture of the cavity is occluded by the mask with respect to the area to be illuminated;
    a baffle positioned in a region between the mask and the reflective surface of the base, the baffle dividing the region into sections; and
    a plurality of emitters, each emitter being coupled for emission of light into a distinct one of the sections.

11. A light distributor as in claim 10, wherein the diffusely reflective cavity is formed in the base.

12. A light distributor as in claim 10, wherein:
    the baffle divides the region into four sections; and
    the plurality of emitters comprises four emitters, each of the four emitters being coupled to emit light into a distinct one of the four sections.

13. A light distributor as in claim 10, wherein each of the reflective surfaces has a substantially diffuse reflective characteristic with respect to light from the emitters.

14. A light distributor as in claim 13, wherein surfaces of the baffle have a substantially diffuse reflective characteristic with respect to light from the emitters.

15. A light distributor as in claim 10, wherein the baffle extends into and divides the cavity so that the sections extend into the cavity.

16. A light distributor as in claim 10, wherein each of the emitters emits light having a distinct spectral characteristic.

17. A light distributor as in claim 10, wherein said one of the reflective surfaces comprises a reflective shoulder formed around at least a substantial portion of the diffusely reflective cavity.

18. A light distributor as in claim 17, wherein the reflective shoulder has a substantially diffuse reflective characteristic with respect to light from the emitters.

19. A light distributor as in claim 10, wherein the mask constructively occludes the cavity in such a manner that the light distributor exhibits a tailored intensity distribution over a range of angles in the area to be illuminated.

20. A light distributor as in claim 19, wherein the tailored intensity distribution is substantially uniform in intensity over the range of angles in the area to be illuminated.

21. A light distributor as in claim 19, wherein the range of angles in the area to be illuminated includes angles about a central axis of the light distributor extending into through the mask and the cavity and into the area to be illuminated.

* * * * *